United States Patent
Makino

[11] Patent Number: 5,934,592
[45] Date of Patent: *Aug. 10, 1999

[54] PHOTOGRAPHIC ROLL FILM

[75] Inventor: Teruyoshi Makino, Kanagawa, Japan

[73] Assignee: Fuji Photo Film Co., Ltd., Kanagawa, Japan

[*] Notice: This patent is subject to a terminal disclaimer.

[21] Appl. No.: 08/978,628

[22] Filed: Nov. 25, 1997

Related U.S. Application Data

[62] Division of application No. 08/712,387, Sep. 11, 1996, Pat. No. 5,845,869.

[30] Foreign Application Priority Data

| Sep. 13, 1995 | [JP] | Japan | 7-235127 |
| Sep. 14, 1995 | [JP] | Japan | 7-236993 |
| Sep. 25, 1995 | [JP] | Japan | 7-245871 |
| Nov. 1, 1995  | [JP] | Japan | 7-284827 |

[51] Int. Cl.$^6$ .................................................. G03B 17/26
[52] U.S. Cl. ........................................ 242/348.4; 396/512
[58] Field of Search ............................ 242/332.2, 348.4, 242/160.4; 396/512, 513, 515, 210; 206/410

[56] References Cited

U.S. PATENT DOCUMENTS

| 1,930,144 | 10/1933 | Lee . | |
| 3,260,182 | 7/1966 | Nerwin | 396/512 |
| 3,768,894 | 10/1973 | Cook | 352/130 |
| 4,588,272 | 5/1986 | Hoda et al. | 396/210 |
| 4,733,777 | 3/1988 | Geyte et al. | 206/410 |
| 4,860,037 | 8/1989 | Harvey | 396/210 |
| 5,083,155 | 1/1992 | Kataoka et al. | 242/348.4 |
| 5,264,886 | 11/1993 | Byrd | 396/515 |
| 5,347,334 | 9/1994 | Smart et al. . | |
| 5,353,933 | 10/1994 | Takahashi et al. | 206/410 |
| 5,587,756 | 12/1996 | Mehra et al. | 396/515 |
| 5,701,538 | 12/1997 | Yasui | 396/512 |

FOREIGN PATENT DOCUMENTS

| 0 342 372 | 11/1989 | European Pat. Off. . |
| 0 414 265 | 2/1991 | European Pat. Off. . |
| 1251030 | 10/1989 | Japan . |
| 2137842 | 5/1990 | Japan . |
| 2160231 | 6/1990 | Japan . |
| 2235052 | 9/1990 | Japan . |

*Primary Examiner*—John M. Jillions
*Attorney, Agent, or Firm*—Sughrue, Mion, Sinn, Macpeak & Seas, PLLC

[57] ABSTRACT

In a 120- or 220-size roll film, a leader of a light-shielding paper has at least a hole to be engaged with a claw formed in a slit of a spool core. A pair of ribs are formed on an opposite wall of the slit from the claw. The ribs have a height larger than a thickness of the light-shielding paper plus a distance from a peak of the claw to the opposite wall, so that the ribs urge the leader toward the claw, and let the hole be caught on the claw. The claw has side projections which protrude in an axial direction of the spool core in proximity to the peak of the claw. Guide surfaces of the claw which face entrances of the slit are inclined toward each other, such that the hole caught on the claw is guided to be engaged with the side projections upon the leader being relatively moved away from the slit when the spool is rotated.

14 Claims, 19 Drawing Sheets

PHOTOGRAPHIC ROLL FILM

This is a Divisional of application Ser. No. 08/712,387 filed Sep. 11, 1996, now U.S. Pat. No. 5,845,869.

BACKGROUND OF THE INVENTION

1. Field of the Invention

The present invention relates to a photographic roll film, especially 120-size or 220-size roll film.

2. Description of the Related Art

ISO120-size and 220-size roll films are well known as Brownie film in the art which both have an appearance as shown in FIG. 29. In a 120-size roll film 1, a filmstrip 2 is secured to a light-shielding backing paper 3 which extends over the filmstrip 2, as is shown in FIG. 30. A 220-size roll film uses a longer filmstrip than 120-size, while a backing paper is replaced by a leader paper and a trailer paper which are secured to opposite ends of the elongated filmstrip. Thus, the 220-size roll film has a larger number of available exposure frames, compared with the 120-size. In both sizes, the filmstrip is coiled around a spool 5.

The spool 5 is standardized according to ISO 732-1982, ANSI PHI 21-1980, JIS K7512-1985 etc., which is constituted of a spool core 6, a pair of flanges 7 provided on opposite ends of the spool core 6, and a slit 8 formed along the spool core 6, as is shown in FIG. 31. The flanges 7 confine and align edges of the backing paper 3 rolled on the spool core 6.

To manufacture the roll film 1, a trailer 3b is inserted in the slit 8. Then, the spool 5 is rotated to coil the filmstrip 2 with the backing paper 3 around the spool core 6. Thereafter, a leading end 3a of the backing paper 3 is bent and is secured with an adhesive tape 9 to prevent unwinding. In a center of each end face of the flanges 7, there is a chucking groove 10 to be engaged with a key shaft of a camera.

To load the roll film 1, another spool having the same construction as the spool 5 should previously be positioned in a film take-up chamber of the camera. After opening a rear lid of the camera, the photographer first peals off the tape 9 while holding the backing paper 3 so as not to unwind. Then, the chucking grooves 10 are engaged with the key shafts of a film supply chamber of the camera.

The leader 3a is then inserted in the slit 8 of the spool 5 in the film take-up chamber, hereinafter referred to as a take-up spool, as is shown in FIGS. 31 and 32. Then, a windup lever of the camera is operated to rotate the take-up spool 5 to wind the backing paper 3 around the spool core 6 of the take-up spool 5 more than one turn, usually two or three turns. When the leader 3a is thus secured to the take-up spool 5, the rear lid is closed, and the windup lever is further operated to position the filmstrip 2 in an appropriate exposure position.

After each exposure, the windup lever is operated to wind up the exposed frame of the filmstrip 2 onto the take-up spool 5. When all available frames have been exposed, the windup lever is allowed to be operated without stop, so that the entire length of the roll film 1 is wound up onto the take-up spool 5. Thereafter, the rear lid is opened to remove the exposed roll film 1. Then, the trailer 3b, which is now on the outermost convolution of the roll, is secured with an adhesive tape. The spool 5 left in the film supply chamber is replaced in the film take-up chamber for the next loading of an unexposed roll film.

However, because the leader 3a is apt to slip off the slit 8, the photographer should hold the backing paper. 3 so as not to slip off the slit 8 while operating the windup lever. This is obviously inconvenient. Moreover, if the leader 3a is not properly wound on the spool 5, e.g. if the leader 3a is deviated in the axial direction relative to the spool 5, the deviation would increase with increasing number of turns, and the edge of the backing paper 3 is bent to loosen the roll on the spool 5. As a result, light-tightness between the edges of the backing paper 3 and the flanges 7 is lowered so that the filmstrip 2 can be fogged.

Several solutions have been suggested to prevent the slip. For example, JPA 1-251030 provides protrusions in the slit to increase frictional resistance between the light-shielding paper or backing paper and the spool; JPA 2-235052 provides cutouts through the leader of the light-shielding paper, so as to be engaged with projections in the slit of the spool; JPA 2-137842 makes surface deformation treatment on either or both of contacting surfaces between the spool and the leader of the light-shielding paper, so as to be engage with each other; and JPA 2-160231 shapes the spool to have a particular edge angle between the spool core periphery and the inner surface of the slit.

However, any of the above known solutions do not completely prevent the slip-off of the leader so that it is still necessary to hold the leader to the slit of the spool with the fingers until the leader has been securely wound around the spool. Thus, none of these known spools achieve sufficiently easy and reliable loading and preliminary winding of the 120 or 220-size roll film.

On the other hand, there are various spools for 35 mm or ISO 135-size roll film that has claws in a slit to engage with holes of a film leader. U.S. Pat. No. 1,930,144 even suggests that the spool disclosed therein is applicable to those roll films which are attached with light-shielding paper. However, all of the spools suggested for 135-size roll film designate the direction to insert the film leader into the slit. Therefore, if such a spool could be used for 120 or 220-size roll film, it would be necessary to insert the leader of the light-shielding paper from the right direction into the slit of the spool placed in the film take-up chamber at every film loading. That would lower the efficiency of loading, and could cause improper preliminary winding. It has been difficult to automatize the loading and preliminary winding of the 120 or 220-size roll film.

SUMMARY OF THE INVENTION

It is a principal object of the present invention to provide a spool that permits easy and reliable loading and preliminary winding of the 120 or 220-size roll film, and hence permits automatic loading and preliminary winding of the 120 or 220-size roll film.

To achieve the above object and other advantages in a photographic roll film having a photographic filmstrip, a light-shielding paper secured to the photographic filmstrip at least at a leading end thereof, and a spool having the photographic filmstrip with the light-shielding paper wound in a roll thereon, according to the present invention, the photographic roll film comprising: at least a hole formed through a leader of the light-shielding paper; a slit formed through a spool core of the spool along an axial direction of the spool core; and at least a claw formed on a first wall of the slit, the claw being engaged with the hole when the leader is inserted in the slit; and at least a rib formed on an opposite parallel wall of the slit to the first wall, the rib pressing the leader of the light-shielding paper toward the first wall.

According to a preferred embodiment, the rib has a height from the opposite wall, which is larger than a thickness of the light-shielding paper plus a distance from a peak of the claw to the opposite wall.

According to another preferred embodiment, the claw has side projections in proximity to the peak, the projections extending in the axial direction of the spool core.

According to a further preferred embodiment, the claw and rib are individually symmetrical about a plane extending through an axial center of the spool core and perpendicularly to the walls of the slit, and guide surfaces of the claw and rib which face open sides of the slit are inclined relative to the walls to taper off to respective peaks, and wherein the guide surfaces of the claw have an inclination angle $\theta$ at least in portions proximate the side projections, the inclination angle $\theta$ being defined as follows:

$$\tan\theta \geq t1/(De-Df)$$

wherein t1 is a thickness of the side projection;

De is a distance between forward edges of the side projections and an initial contact point of a rim of the hole with a forward one of the guide surfaces of the claw with respect to an inserting direction of the light-shielding paper into the slit; and Df is a distance between the initial contact point and a final contact point of the rim with the forward guide surface of the claw, where the hole is engaged with the side projections.

BRIEF DESCRIPTION OF THE DRAWINGS

The above objects and advantages of the present invention will become more apparent upon reading the detailed description of the embodiments in connection with the accompanying drawings, wherein like reference numerals designate like or equivalent parts throughout the several views, and wherein.

DETAILED DESCRIPTION OF THE EMBODIMENTS

Figure 1:
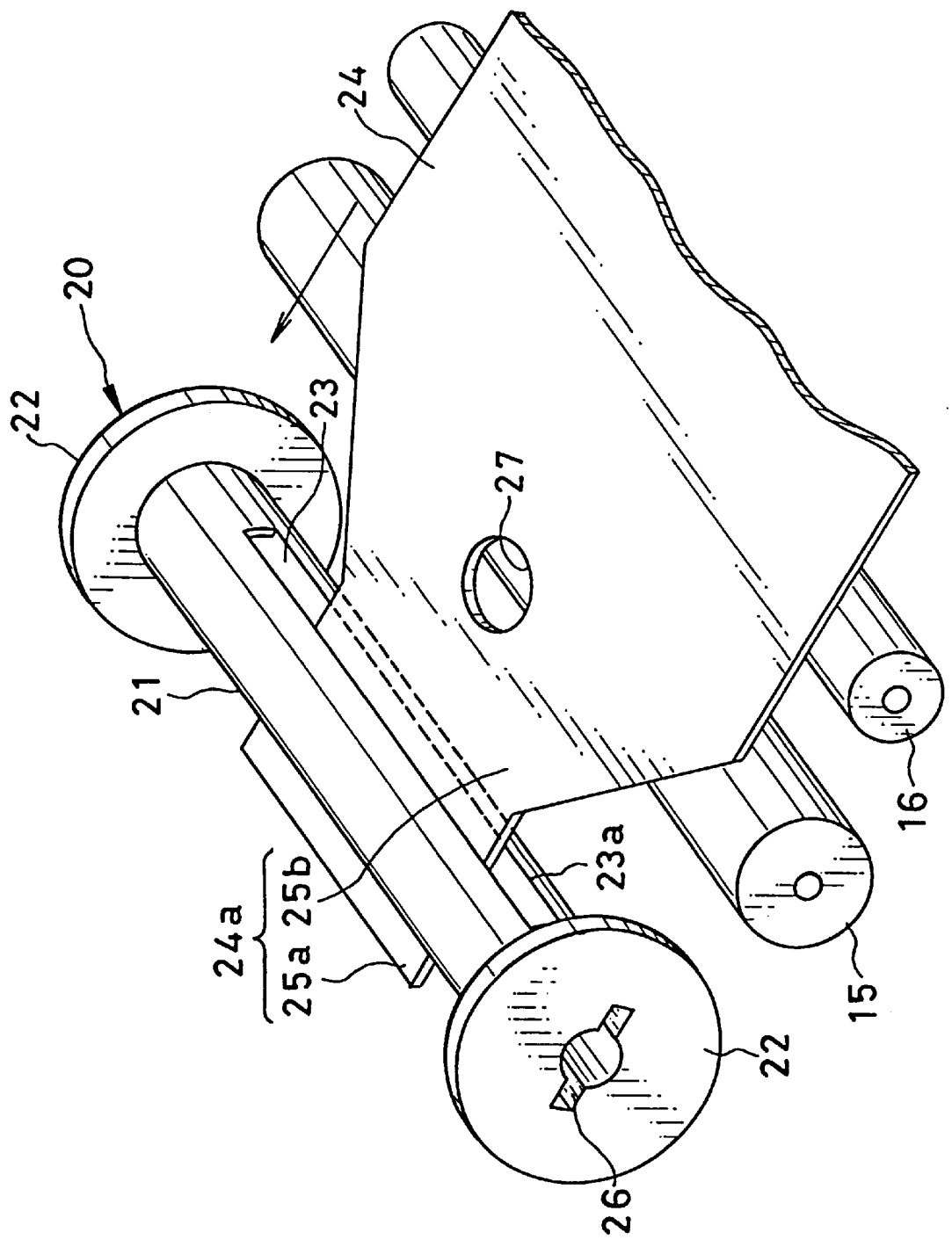
FIG. 1 is a perspective view illustrating an automatic insertion of a leader of a light-shielding paper of a film into a slit of a spool according to a first embodiment of the invention.

In FIG. 1, a spool 20 according to the invention is constituted of a spool core 21, and a pair of flanges 22 formed on opposite ends of the spool core 21. A slit 23 formed through an axial center of the spool core 21 along the axial direction thereof. A leader 24a of a light-shielding paper 24 which backs a filmstrip 28 in a 120-size is to be inserted in the slit 23. The leader 24a has a narrower tip 25a and a trapezoidal portion 25b whose edges 25c are tapered to the tip 25a, as shown in FIG. 2.

In a center of each flange 22 is formed a chucking groove 26 to be engaged with a key shaft which is provided in each of a film supply chamber and a film take-up chamber of a camera. The chucking groove 26 may have a plus shape. But it is preferable to make the chucking groove 26 have a minus shape extending in the same radial direction as the slit 23, as is shown in FIG. 1, because it facilitates positioning the slit 23 in a proper angular position in the film supply or the film take-up chamber. This configuration is preferable especially for automatic film loading. A round hole 27 is formed through the light-shielding paper 24 at the trapezoidal portion 25b of the leader 24a. In FIG. 1, reference numbers 15 and 16 designate a guide roller and a drive roller of the camera, respectively.

Figure 2:
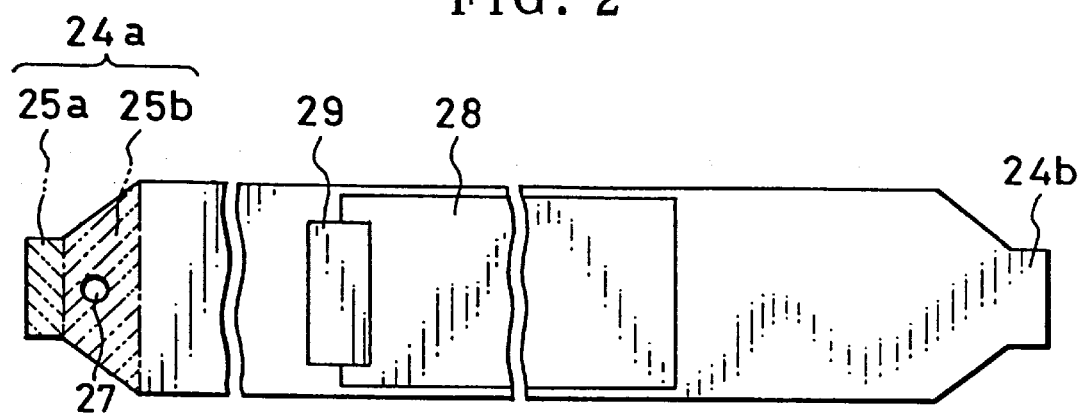
FIG. 2 is a plan view of a 120-size film having a hole formed through the leader, according to the first embodiment of the invention.

As shown in FIG. 2, the filmstrip 28 of the 120-size is secured at its leader to the light-shielding paper 24 with an adhesive tape 29, and the light-shielding paper 24 backs and extends beyond the entire length of the filmstrip 28. When rolled around the spool core 21 of the spool 20, the photosensitive emulsion surface of the filmstrip 28 faces inward.

A trailer 24b of the light-shielding paper 24 has no hole for engagement with the spool 20. When the 120-size roll film according to the invention is manufactured, the trailer 24b is inserted in the slit 23 for winding the unexposed filmstrip 28 unexposed. Therefore, the trailer 24b can smoothly move out of the slit 23 to wind up onto the other spool 23 that is previously positioned in the film take-up chamber after the completion of exposure of all available frames.

Figure 3:
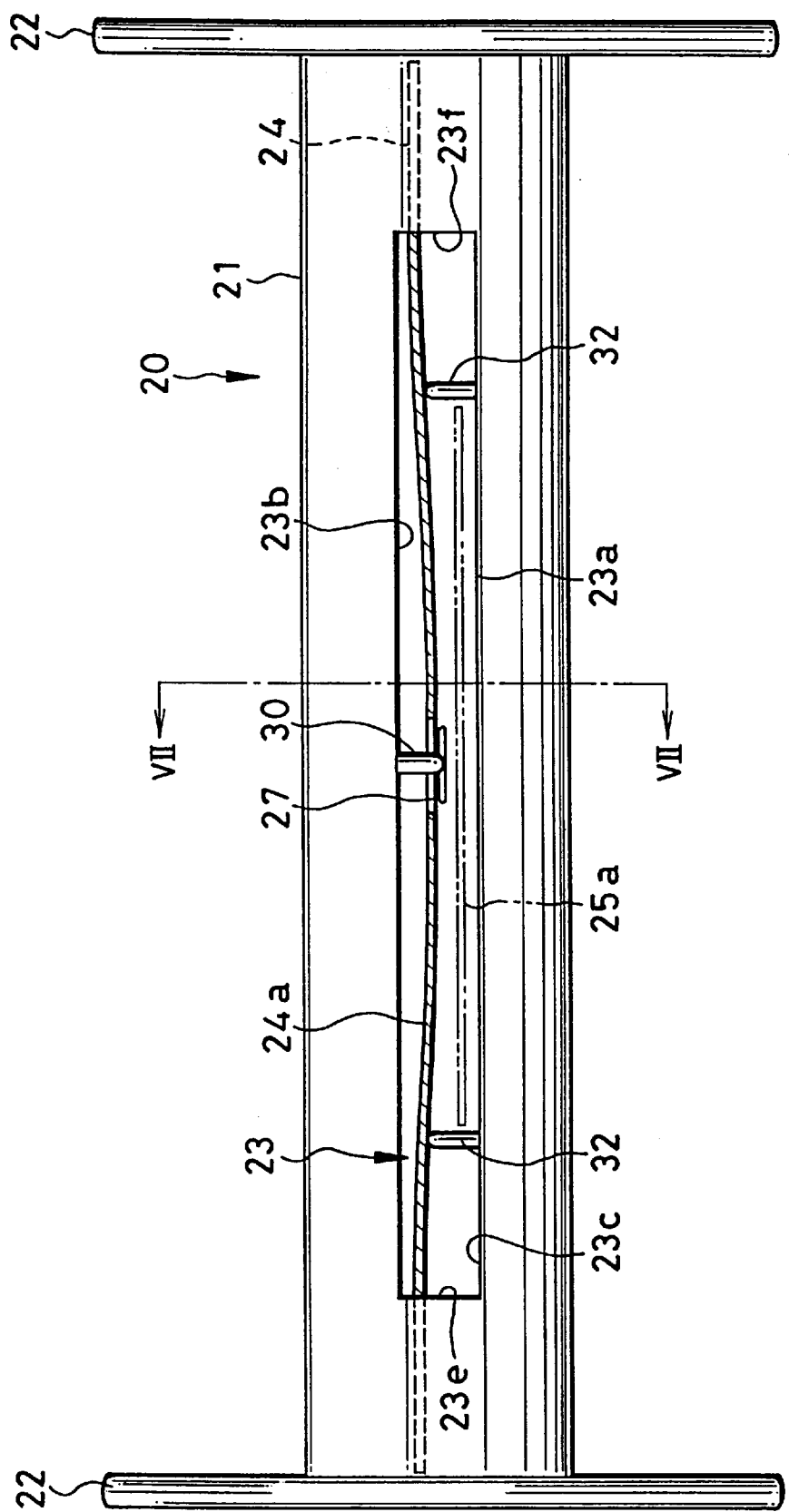
FIG. 3 is a front view of the spool with the hole of the leader engaged with a claw of the spool.

As shown in FIG. 3, a claw 30 is formed on one wall 23b of the slit 23 in a middle position there of, while a pair of ribs 32 are formed on an opposite wall 23c of the slit 23. The walls 23b and 23c are parallel to each other. The claw 30 is to engage with the hole 27 of the leader 24a of the light-shielding paper 24. The ribs 32 are to press the leader 24a toward the claw 30 on opposite lateral sides of the hole 27 with respect to the inserting direction, so as to secure the engagement between the hole 27 and the claw 30. The ribs 32 are spaced equally from the claw 30 in the axial direction of the spool core 21. The claw 30 itself is symmetrical about a radial surface of the spool core 21.

Figure 4:
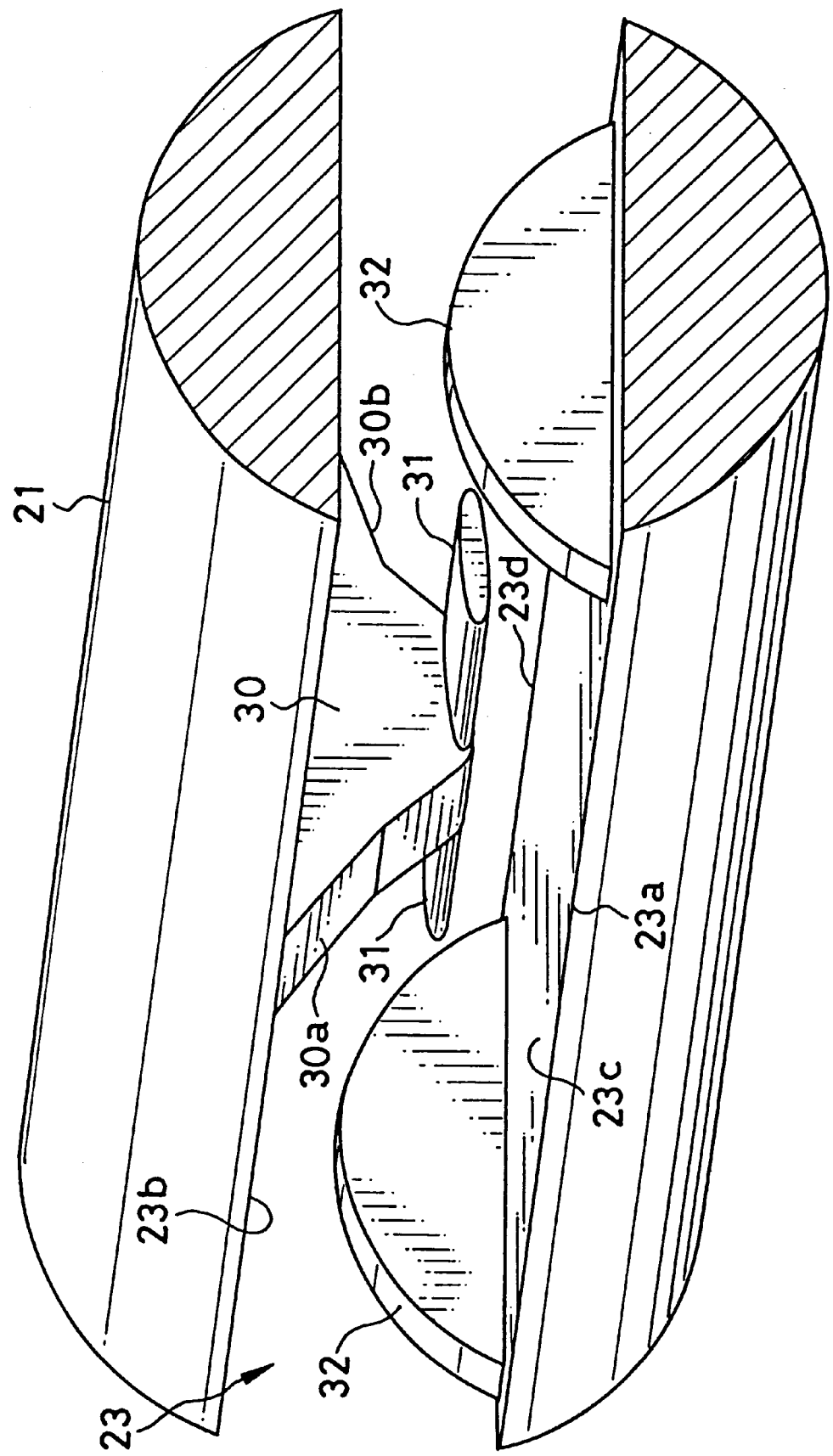
FIG. 4 is an enlarged perspective view showing the claw and ribs formed in the slit of the spool according to the first embodiment of the invention.

As shown in FIG. 4, the ribs 32 and the claw 30 are also symmetrical about a surface which extends through the axial center of the spool core 21 and perpendicularly to the walls 23b and 23c. Therefore, the leader 24a may be equally inserted in the slit 23 from either open side 23a or 23d of the slit 23. The claw 30 has guide surfaces 30a and 30b, which are inclined toward each other with two different inclination angles each. The guide surfaces 30a and 30b face the open sides 23a and 23d of the slit 23 to guide the narrower tip 25a of the leader 24a to a tip of the claw 30. In proximity to the tip of the claw 30, side projections 31 protrude from both lateral sides of the claw 30 with respect to the leader inserting direction. The side projections 31 extend in the axial direction of the spool core 21 in parallel to the walls 23b and 23c of the slit 23. Because the side projections 31 are spaced from the tip of the claw 30, the side projections 31 do not hinder the narrow tip 25a from passing over the tip of the claw 30. The shape of each side projection 31 is approximately planar but is gently curved to round those edges which face the open sides 23a and 23d of the slit 23. So the side projections 31 will not hinder the insertion of the leader 24a of the light-shielding paper 24.

The ribs 32 have a symmetrical semi-circular shape and extend in the radial direction of the spool core 21, so as to permit guiding the leader 24a toward the claw 30 from either open side 23a or 23d of the slit 23. This configuration of the ribs 32 also permits smooth insertion of the trailer 24b of the light-shielding paper 24 or a leader or a trailer of a conventional light-shielding paper into the slit 23. Accordingly, the spool 20 according to the invention may be used with a conventional 120-size or 220-size film.

Figure 5:
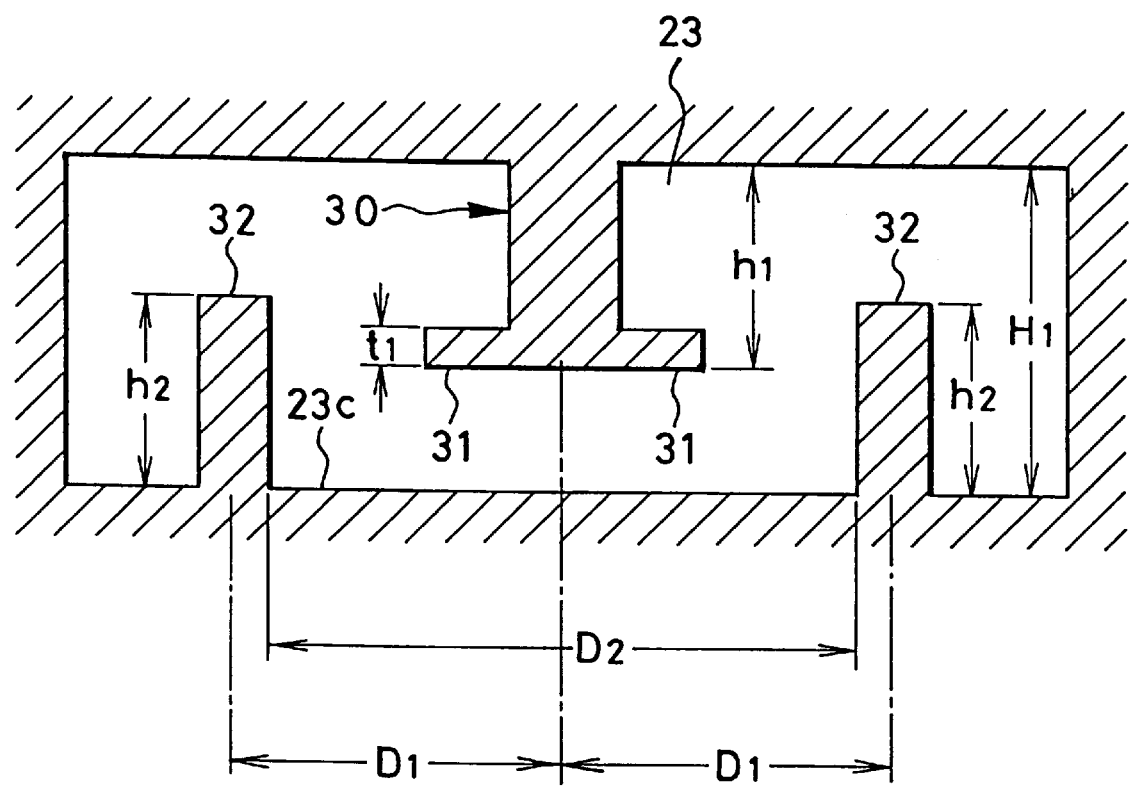
FIG. 5 is an explanatory view illustrating dimensions of the claw and the ribs in the slit of the first embodiment.

Referring to FIG. 5, provided that the claw 30 has a height h1 from the wall 23b, that the ribs 32 have a height h2 from the wall 23c, that the side projections 31 have a thickness t1, and that the slit 23 has a width H1, i.e., a distance between the walls 23b and 23c, it is preferable to satisfy a condition: $H1+t1<h1+h2<2 \cdot H1$. Under this condition, the ribs 32 can push the leader 24a of the light-shielding paper 24 toward the claw 30 to ensure the engagement of the claw 30 in the hole 27.

In particular, H1 is most preferably 1.8 mm to 3.0 mm, whereas h1+h2 is most preferably H1+t1+(0.1 mm to 0.5 mm). In other words, it is most preferable that the claw 30 and the ribs 32 overlap each other in the width direction of the slit 23 by an amount t1+(0.1 mm to 0.5 mm). A distance D1 between the centers of the claw 30 and the rib 32 in the axial direction of the spool core 21 must be adjusted according to the stiffness and the shape of the leader 24a, but a preferable range of D1 is 5 mm to 20 mm, and more preferably from 7 mm to 17 mm. Without the side projections 31, it is possible to define that h1+h2+(thickness of the light-shielding paper 24)>H1, but h1+h2>H1 is preferable. According to this configuration, the light-shielding paper 24 would always be brought into contact with the claw 30 when inserted into the slit 23, to ensure the engagement between the claw 30 and the hole 27.

Figure 6:
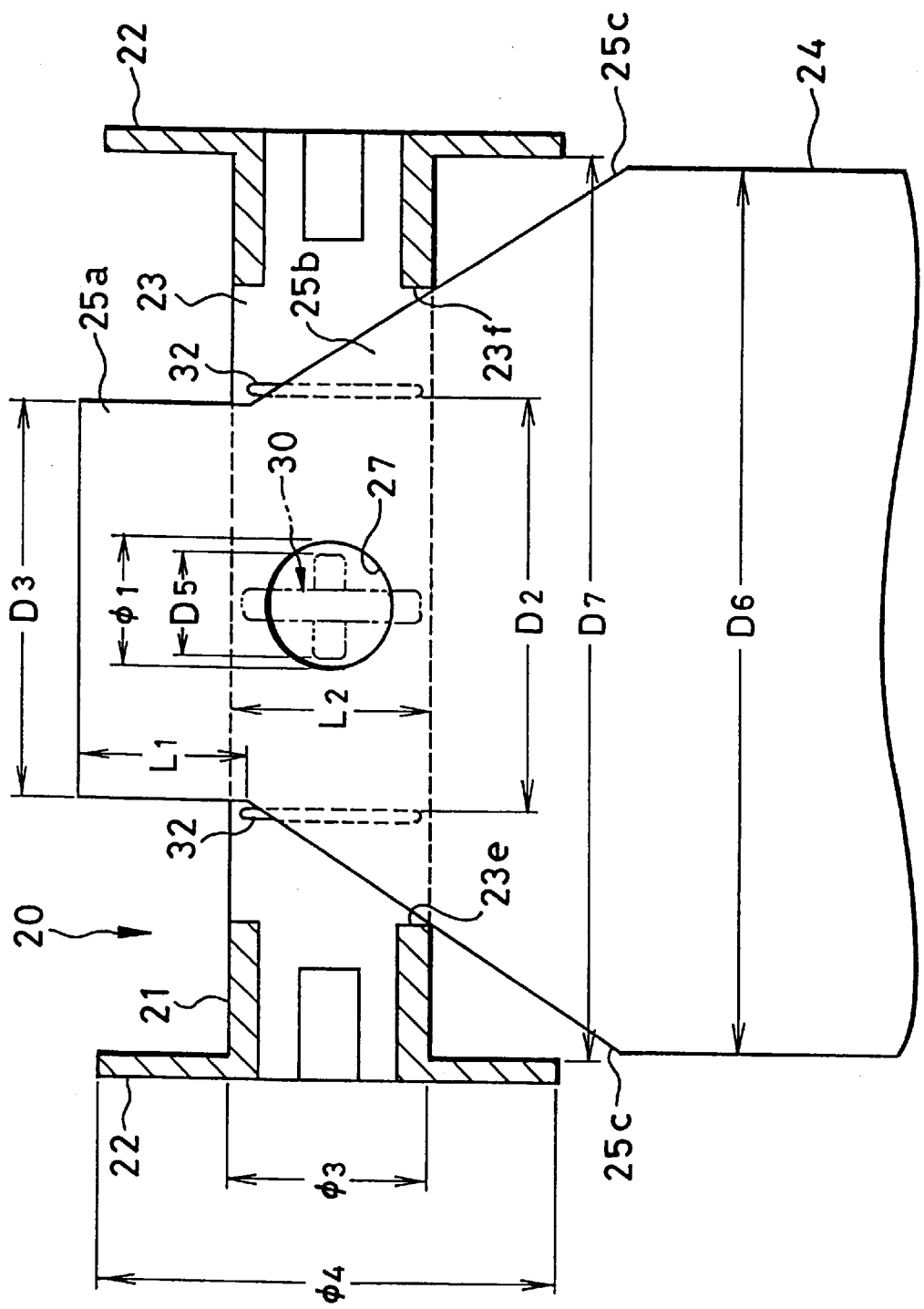
FIG. 6 is an explanatory sectional view taken along the axial direction of the spool of the first embodiment, illustrating the relationship between the claw and the hole of the leader of the film.

The ribs 32 are spaced from each other by a distance D2 which is more than a width D3 of the leader 24a in the narrow tip 25a, as shown in FIG. 6. The narrow tip 25a has a length L1 in the inserting direction, which is more than half a length L2 of the slit 23 in the inserting direction. According to this configuration, as the leader 24a is being inserted into the slit 23, the narrow tip 25a is guided at its lateral edges along the ribs 32 for a certain time, as is shown by phantom lines in FIG. 3. Therefore, the light-shielding paper 24 is inserted straight into the slit 23 perpendicularly to the axial direction of the spool core 21. While the leader 24a is being further inserted through the slit 23, the leader 24 is centered with the center of the slit 23 in the axial direction of the spool core 21. Further insertion makes the tapered edges 25c of the trapezoidal portion 25b ride on the ribs 32, as shown in FIG. 6.

Figure 7:
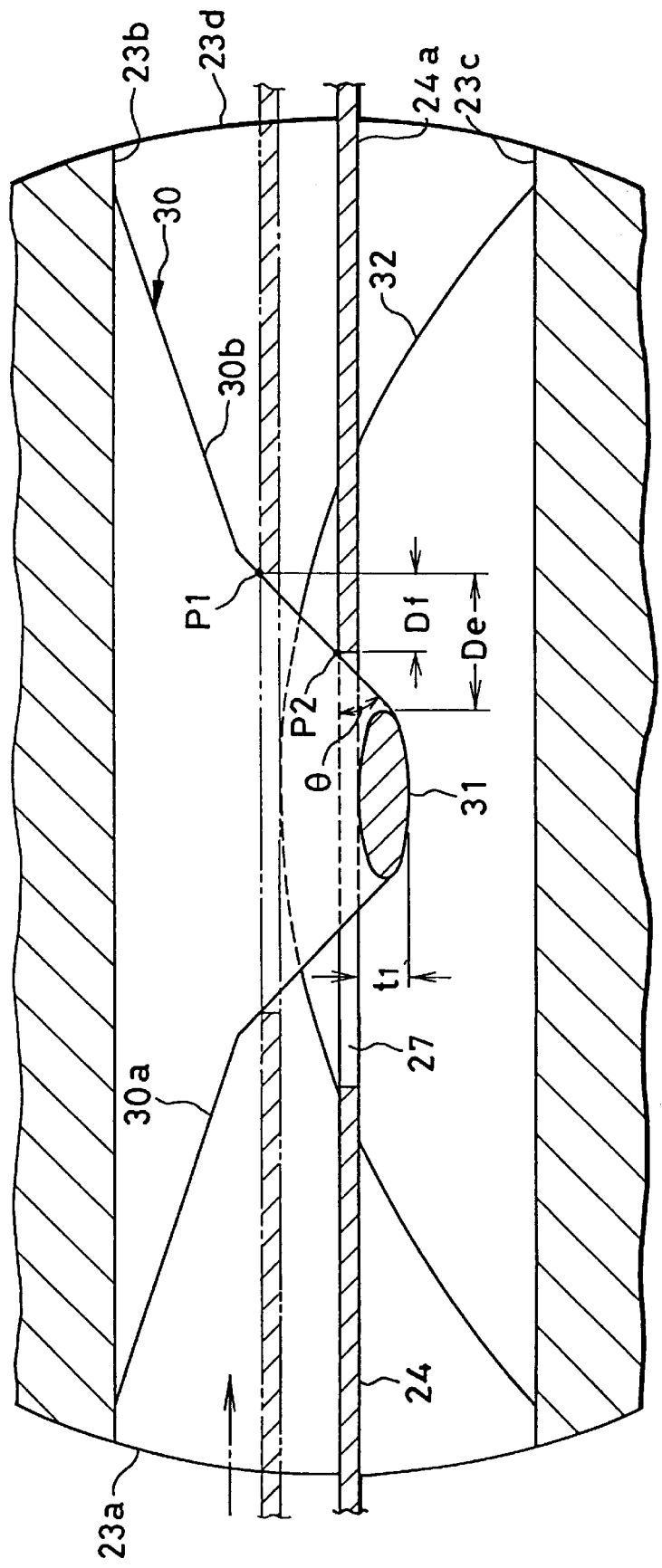
FIG. 7 is an enlarged sectional view taken along a line VII—VII of FIG. 3, illustrating a position where the hole is engaged with side projections of the claw.
Figure 8:
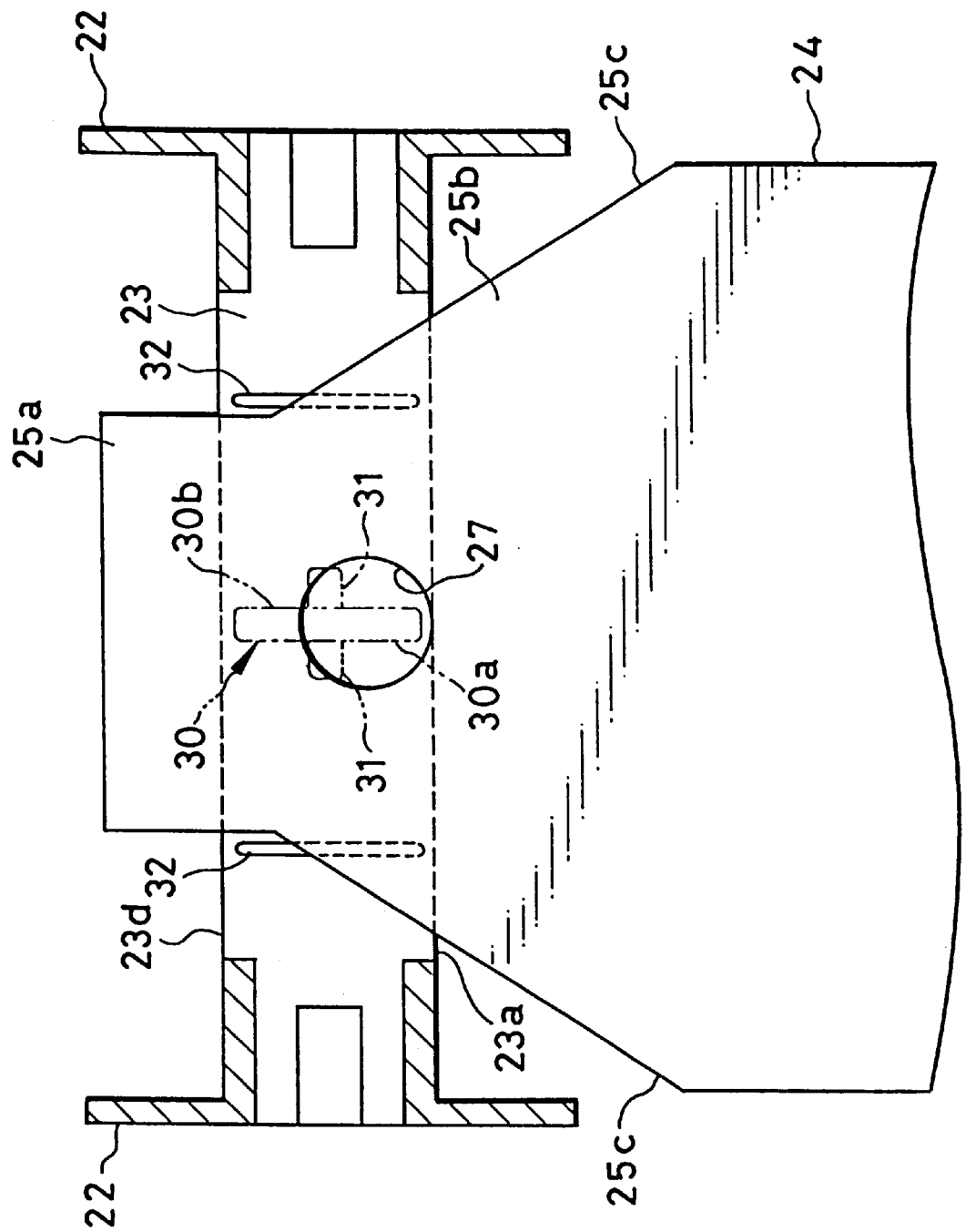
FIG. 8 is an explanatory sectional view taken along the axial direction of the spool, illustrating the same position as shown in FIG. 7.

The hole 27 is disposed such that the center of the hole 27 is opposed to the center of the claw 30 when the leader 24a is stopped from further insertion into the slit 23 when the tapered edges 25c of the trapezoidal portion 25b come into contact with side margins 23e and 23f of the slit 23. Therefore, the hole 27 is automatically caught on the claw 30 upon a predetermined amount of insertion of the leader 24 into the slit 23. This facilitates automatic film loading. The diameter φ1 of the hole 27 is determined to be 0.5 mm to 1.0 mm more than a distance D5 between distal ends of the side projections 31. Therefore, the hole 27 can be reliably caught on the claw 30 just by inserting the leader 24a into the slit 23. Once the hole 27 is engaged with the claw 27, the leader 24 is moved upward or toward the claw 30 under the pressure of the ribs 32, until the rim of the hole 27 comes into contact with the guide surfaces 30a and 30b of the claw 30, as shown by phantom lines in FIG. 7. The contact point of the hole 27 with the guide surface 30b in this position will be referred to as an initial contact point P1. Thereafter when the spool 20 is rotated in a winding direction, the light-shielding paper 24 relatively moves in a direction to slip off the slit 23. But then, since the hole 27 is moved past the side projections 31, the rim of the hole 27 is guided along the guide surface 30b, and hooked on the side projections 31, as is shown in FIG. 8. The side projections 31 thus secure the engagement between the claw 30 and the leader 24a. As shown, the guide surfaces 30a and 30b of the claw 30 have a shallow angle of inclination with respect to the slit walls in base portions near the wall 23b and a steeper angle of inclination in the peak portion near the tip where side projections 31 are attached.

In order to allow the hole 27 to be automatically engaged with the side projections 31 in the way as above, it is necessary to define the steeper inclination angle θ of the guide surface 30b relative to the walls 23b and 23c of the slit as follows:

$$\tan\theta \geq t1/(De-Df)$$

wherein

Df represents a distance in the inserting direction between the initial contact point P1 and a final contact point P2 of the rim of the hole 27 with the guide surface 30b where the hole 27 is engaged with the side projections 31; and De represents a distance in the inserting direction between the initial contact point P1 and the edges of the side projections 31.

If the values θ, De and Df do not satisfy the above relationship, the hole 27 will not catch on the side projections 31 when the spool 20 is rotated after the hole 27 is engaged with the claw 30.

To ensure the light-tightness between the flanges 22 and the light-shielding paper 24, the width D6 of the light-shielding paper 24 is designed to be equal to or slightly more than the distance D7 between the inside surfaces of the flanges 22 at a peripheral position thereof. For example, D6=62.70 mm to 62.85 mm, and D7=62.70 mm±0.1 mm measured at 1.0 mm to 1.5 mm from the rims of the flanges.

Figure 9:
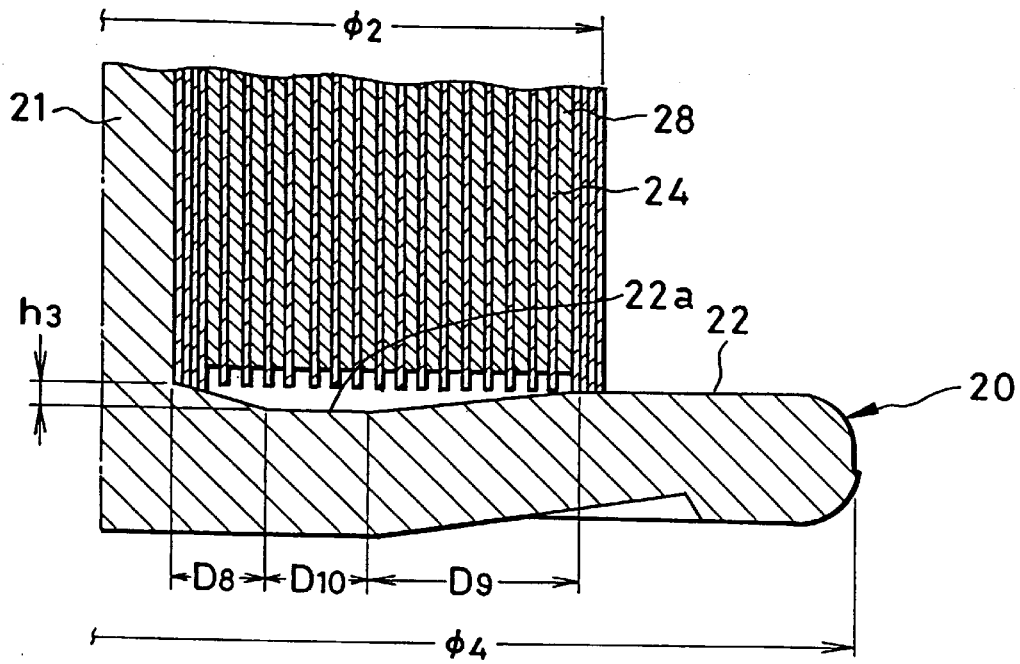
FIG. 9 is a fragmentary sectional view of the spool with the 120-size film wound entirely thereon.

If the width D6 is too large relative to the distance D7, or the width D6 has variations, it is impossible to tightly wind the light-shielding paper 24, so that the diameter φ2 of the roll coiled around the spool core 21 would be enlarged. To prevent this problem, an annular recess 22a with a depth h3 is formed in the inside surface of each flange 22 coaxially around the spool core 21, as shown in FIG. 9. The recesses 22a prevents the edges of the light-shielding paper 24 from bending and folding into the roll, and thus from enlarging the diameter φ2 of the roll. Accordingly, the edges of the light-shielding paper 24 come into tight contact with the inside surfaces of the flanges 22 in the trailer 24b which forms the outermost convolution of the roll, while being prevented from bending in the inner convolutions. So the filmstrip 28 is completely shielded from ambient light.

The depth h3 of the recesses 22a is 0.15 mm to 0.30 mm, and preferably 0.20 mm to 0.25 mm. The recesses 22a have an approximately trapezoidal sectional contour, wherein the widths D8 and D9 of the inclined surfaces are to be as small as possible. In view of the moldability, the widths D8 and D9 are 0.8 mm to 1.0 mm, but should be adjusted according to the depth h3. The width D10 of the bottom surface of the recess 22a is 1.0 mm to 3.0 mm, and preferably 1.5 mm to 2.0 mm. It is useful to round the borders between the inclined surfaces and the bottom surface of the recess 22a for preventing molding failure. The diameter φ3 of the spool core 21 is 11.8 mm to 12.0 mm, and the external diameter φ4 of the flanges 22 is preferably 25.2 mm −0.2 mm to +0.1 mm.

Figure 10:
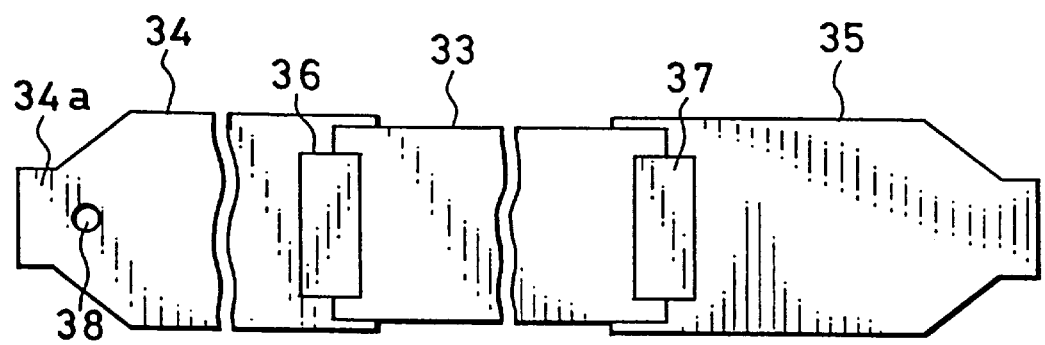
FIG. 10 is a plan view of a 220-size film having a hole formed through a leading paper thereof, according to an embodiment of the invention.
Figure 11:
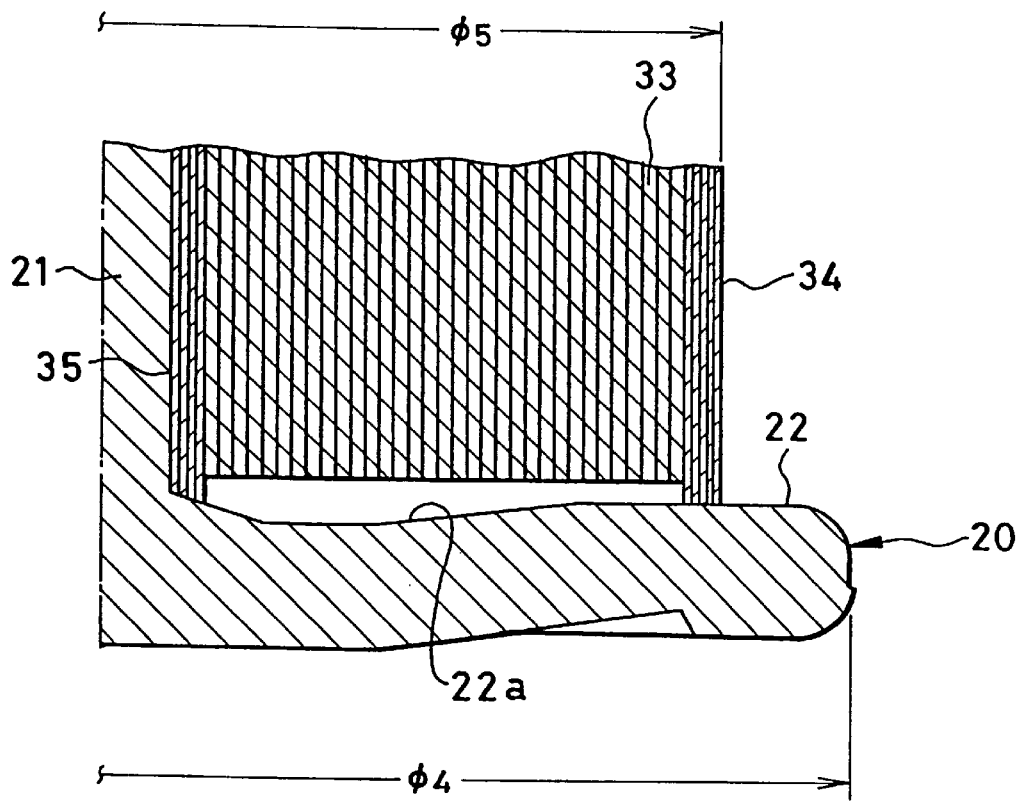
FIG. 11 is a fragmentary sectional view of the same spool as shown in FIG. 9, but with the 220-size film wound entirely thereon.

Referring to FIG. 10 showing a 220-size film for use in a roll film of the invention, a filmstrip 33 is attached at its leading and trailing ends to light-shielding papers called leader 34 and trailer 35, by means of adhesive tapes 36 and 37. As the filmstrip 33 is not backed with a light-shielding paper, the filmstrip 33 may be double the length of the filmstrip 28 of the 120-size and so the number of available frames, while maintaining the diameter φ5 of the roll on the spool 20 sufficiently within the external diameter φ4 of the flanges 22, as is shown in FIG. 11. Also in the 220-size, even if the filmstrip 33 has a small variation in width or if the leader 34 is slightly deviated or crooked, the recesses 22a prevents the edges of the filmstrip 33 from bending and thus prevents enlarging the diameter φ5 of the roll, in the same way as in the 120-size. The light-shielding papers 34 and 35 preferably have the same width D6 as the light-shielding paper 24, so that the edges of the papers 34 and 35 come into tight contact with the inside surfaces of the flanges 22, providing reliable light-shielding effect on the filmstrip 33. According to the embodiment shown in FIG. 10, the leader 34 of the 220-size film has a hole 38 and a narrow tip 34a in the same way as the 120-size film shown in FIG. 2.

When positioning the spool 20 having the above described construction in the film take-up chamber of the camera, the chucking groove 26 is engaged with the key shaft of the film take-up chamber. Since the chucking groove 26 extends in the same radial direction as the slit 23, it is possible to determine the anguler position of the entrances 23a and 23d of the slit 23 with reference to the rotational angle of the key shaft. Therefore, one of the entrances 23a and 23d is oriented toward the guide roller 15 and the drive rollers 16 of the camera by means of a control device of the camera, so that the entrance 23a or 23d may smoothly accept the leader 24a or 34. Because the 120-size and 220-size roll film of the present invention operate equivalently, the operation will be described below with respect to the 120-size roll film for instance.

After the film roll is loaded in the film supply chamber of the camera, the leader 24a is placed on the drive roller 16, and the rear lid is closed to nip the leader 24a between the drive roller and a roller or a plate spring provided on the inside of the rear lid. Then, a motor is driven to rotate the drive roller to feed the leader 24a into the slit 23 through the guide roller 15 and the entrance 23a.

When the edges 25c of the trapezoidal portion 25b of the leader 24a stop against the side margins 23e and 23f of the slit 23, the load on the drive roller 16 jumps up. A control device of the camera detects the change in load on the drive roller 16 and stops transporting the light-shielding paper 24 when the load jumps up. Thereafter, the control device starts rotating the spool 20 in the film take-up chamber to wind up the light-shielding paper. At the start of rotation of the spool 20, the hole 27 of the leader 24a moves toward the tip or peak of the claw 30 to be caught on the side projections 31. Thus, the leader 24a is secured to the spool 20. Further rotation of the spool 20 coils the leader 24 around the spool core 21 by a predetermined amount to position an initial unexposed frame in an exposure position.

When all available frames have been exposed by repeating shutter release and film wind-up operations, the trailer 24b of the light-shielding paper 24 is wound up onto the spool 20 of the film take-up chamber without stop. Since the trailer 24b has no hole like the hole 27 of the leader 24a, the trailer 24b will not be caught on the claw 30 of the spool 20 in the film supply chamber. Thereafter, the rear lid of the camera is opened to remove the exposed roll film from the film take-up chamber. The spool 20 left in the film supply chamber is replaced in the film take-up chamber for the next film loading.

Figure 12:
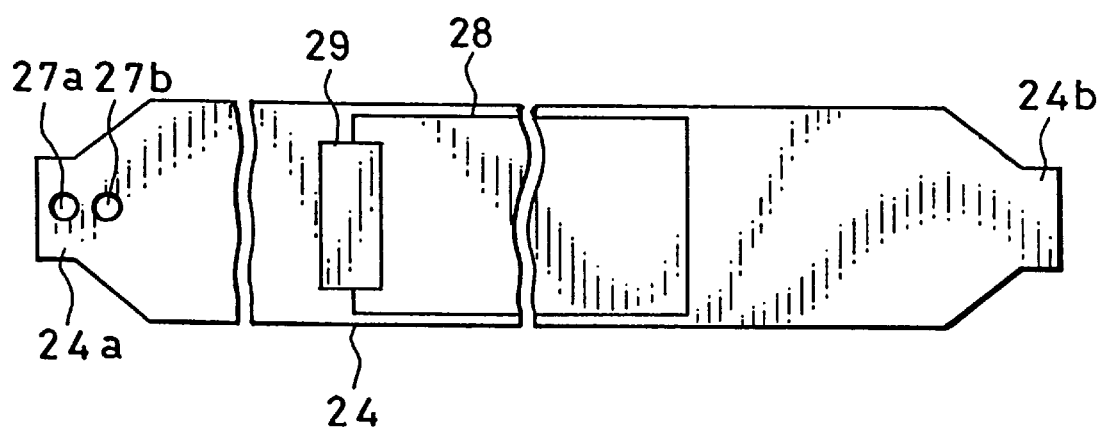
FIG. 12 is a plan view of a 120-size film having two holes formed through a leader of a light-shielding paper, according to another embodiment of the invention.

It is possible to provide two holes 27a and 27b in the leader 24a on the same longitudinal line of the filmstrip, as is shown in FIG. 12. The hole 27 is not necessarily round but oblong or any other shape that is large enough to fit on the claw 30 but provides secure engagement of the leader 24a with the claw 30 at the start of rotation of the spool 20.

Figure 13:
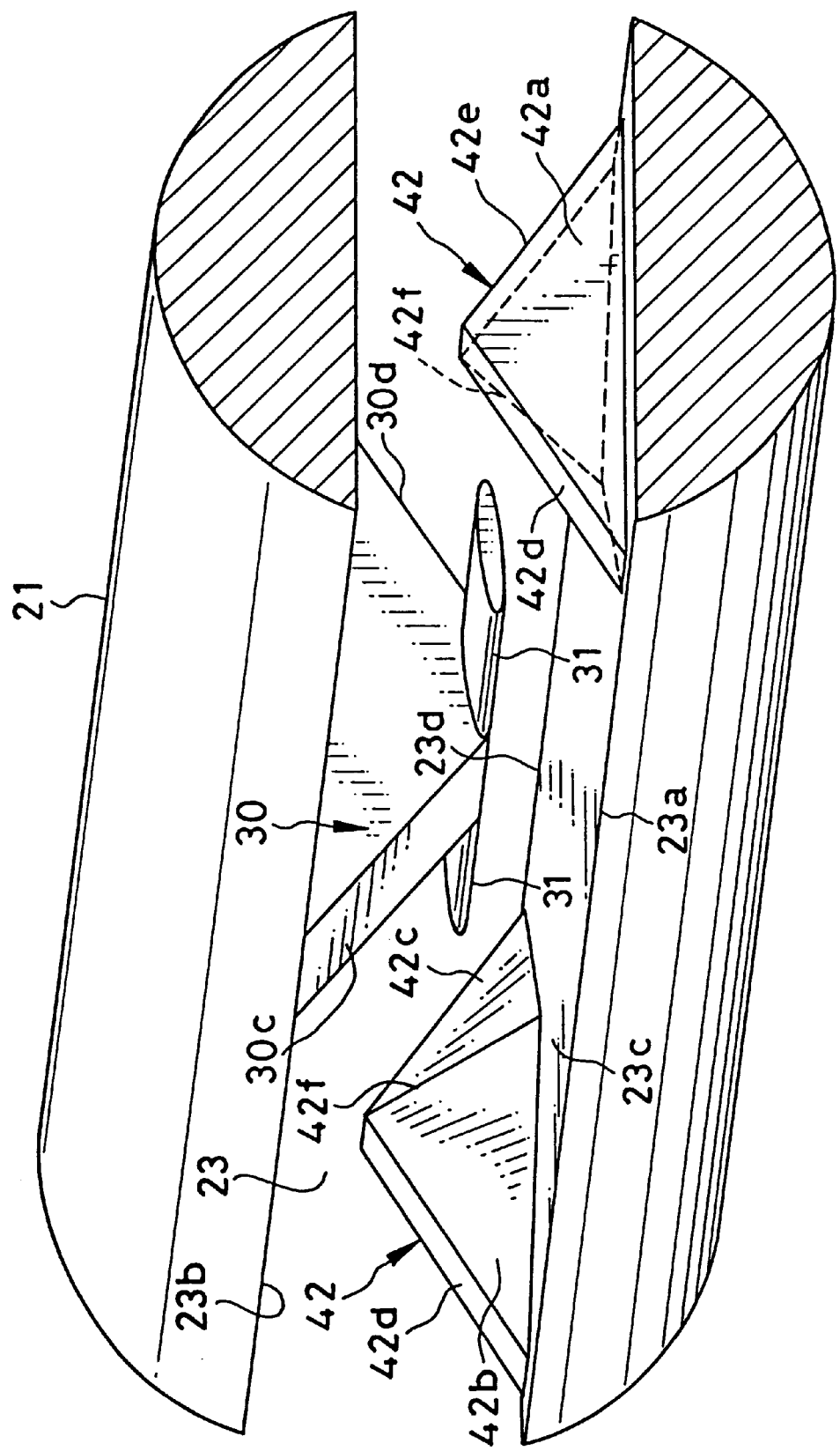
FIG. 13 is a perspective view illustrating essential parts of a spool according to a second embodiment of the invention.
Figure 14:
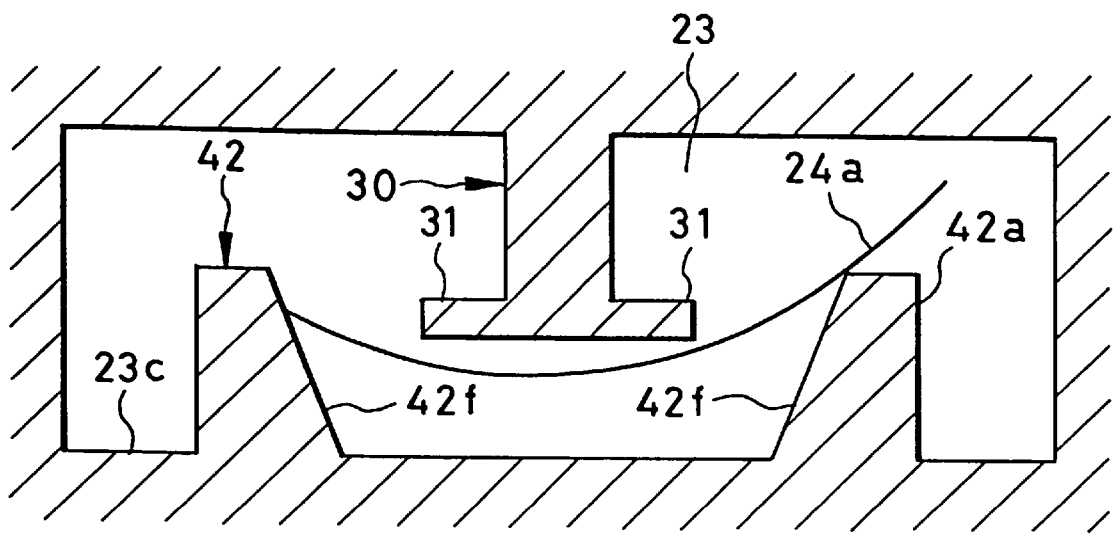
FIGS. 14A and 14B are explanatory views illustrating an advantage of the spool of the second embodiment.
Figure 14:
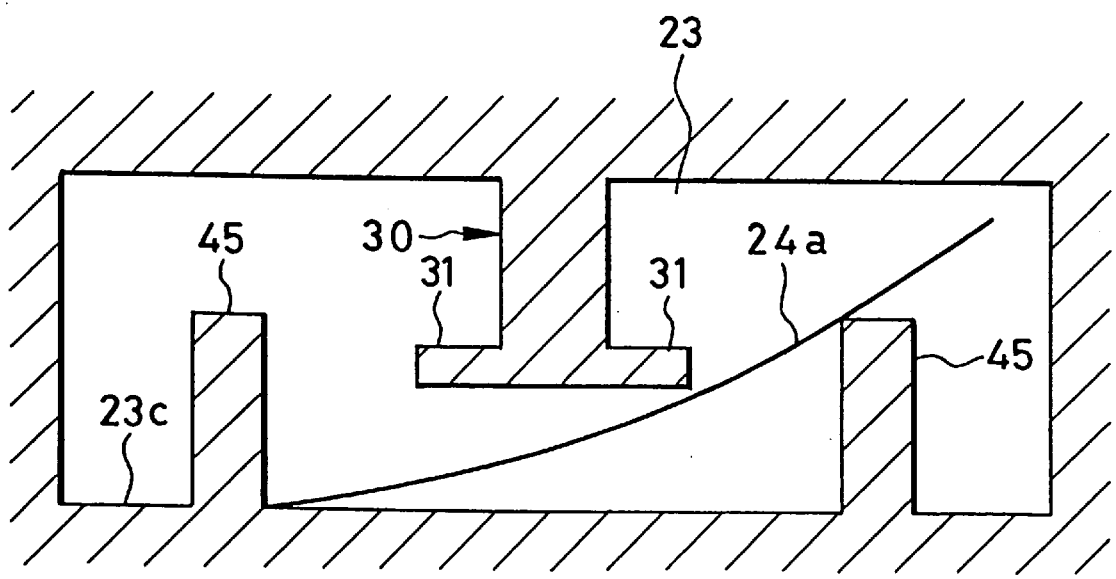

FIG. 13 shows a second embodiment of the invention, wherein a claw 30 is configured substantially the same way as in the first embodiment, but its guide surfaces 30c and 30d are inclined at a constant angle. Ribs 42 for pressing the leader 24a toward the claw 30 have a substantially triangular pyramid shape constituted of one perpendicular triangular side 42a and two oblique triangular sides 42b and 42c to a wall 23c of a slit 23, and there are two guide surfaces 42d and 42e along the crest line between the side 42a and the sides 42b and 42c. These ribs 42 allows the leader 24a to enter the slit 23 from both entrances 23a and 23d. In addition, even if the center of the light-shielding paper 24 is deviated from the center of the slit 23 in the axial direction of a spool core 21, because at least one of the edges of the light-shielding paper 24 is guided on the inclined crest line 42f between the oblique sides 42b and 42c of the rib 42, as is shown in FIG. 14A, the light-shielding paper 24 is centered again under the reactive force from the crest line 42f. In comparison, in a case where internal sides of ribs 45 are perpendicular to the wall 23c of the slit 23, as shown in FIG. 14B, the deviation of the leader 24a from the center of the slit 23 cannot be corrected any more if the deviation exceeds a certain degree.

Figure 15:
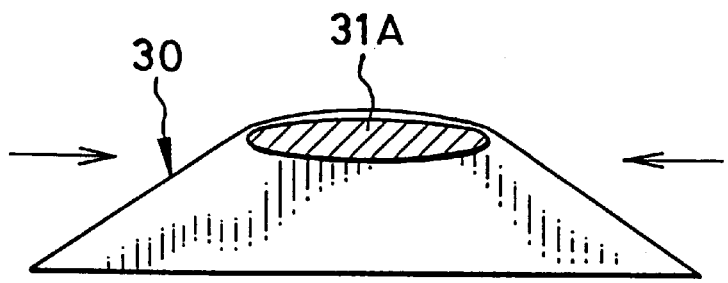
FIGS. 15A, 15B, 15C & 15D are views illustrating various modifications of sectional contours of side projections.
Figure 15:
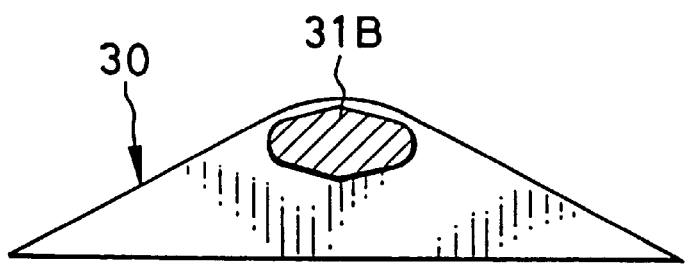
Figure 15:
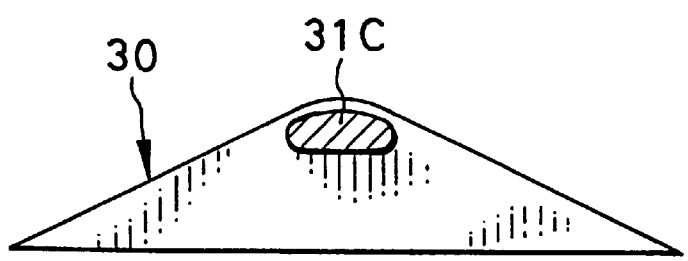
Figure 15:
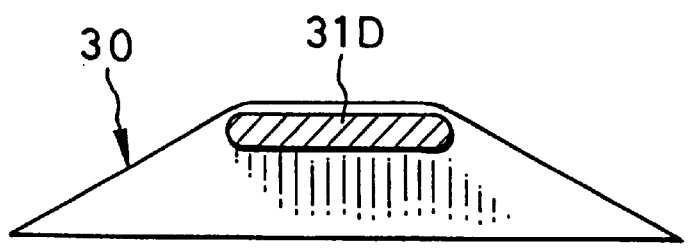

In the embodiments shown in FIGS. 4 and 13, the side projections 31 have an oblong cross section 31A, as shown in FIG. 15A. However, the side projections 31 may have other cross sectional contours 31B, 31C and 31D, as shown in FIGS. 15B, 15C and 15D, respectively. In either case, the edges of the side projection 31 that extend laterally to the film inserting directions (the directions shown by arrows in FIG. 15A) are rounded, and the cross sectional contour of the side projections 31 is symmetrical.

Figure 16:
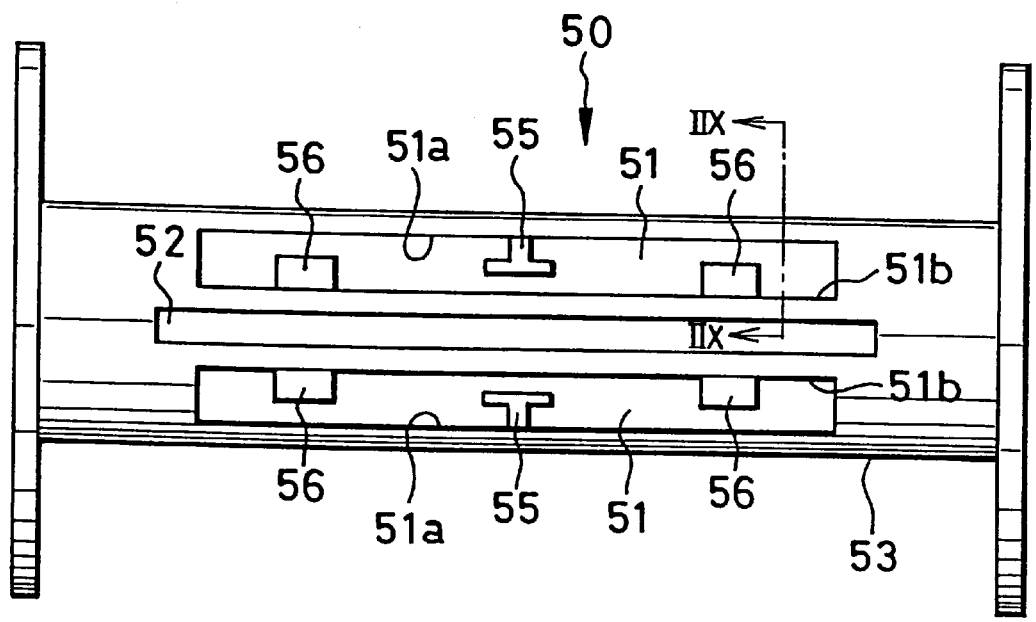
FIG. 16 is a front view of a spool having two slits according to a third embodiment of the invention.

FIG. 16 shows a spool 50 according to a third embodiment of the invention, wherein a plane center slit 52 having no claw and rib is formed through an axial center of a spool core 53, and a pair of engaging slits 51 each having a claw 55 and a pair of ribs 56 for engagement with the light-shielding paper 24 are formed in parallel to the center slit 52 on opposite sides thereof. The center slit 52 is used in manufacturing the roll film, that is, in winding an unexposed film on the spool 50. This embodiment allows holes for engagement with the claw 55 to be provided in both the leader and the trailer of the light-shielding paper.

Figure 17:
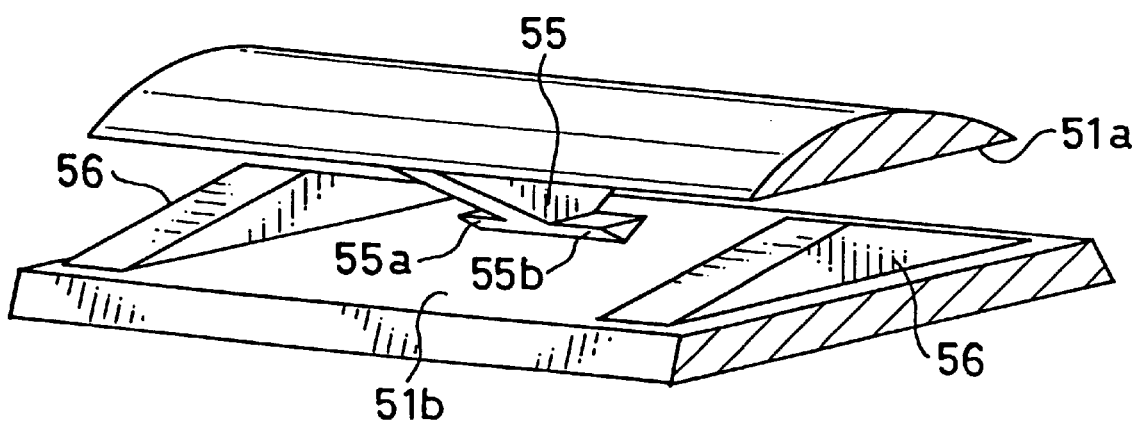
FIG. 17 is an enlarged view illustrating a claw and ribs formed in each slit of the spool of FIG. 16.
Figure 18:
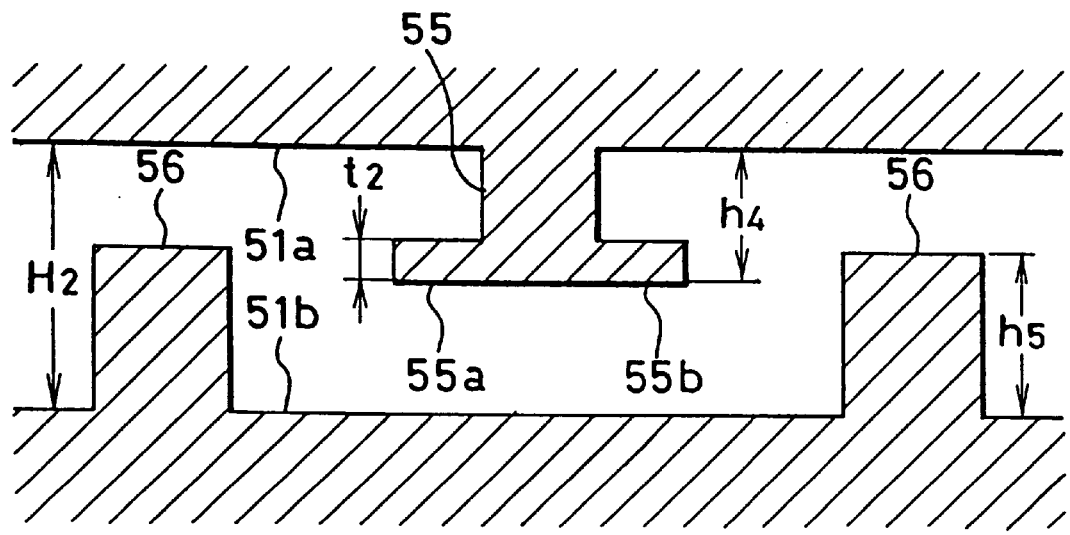
FIG. 18 is an explanatory view illustrating dimensions of the claw and ribs of the spool of the third embodiment shown in FIG. 16.

As shown in FIGS. 17 and 18, the claw 55 has side projections 55a and 55b protruding from lateral sides of the claw 55 with respect to the film inserting direction. In each engaging slit 51, the claw 55 is disposed on a wall 51a of the slit 51, that is closer to the periphery of the spool core 53, whereas the ribs 56 are disposed on opposite lateral sides of the claw 55 on an opposite wall 51b to the wall 51a, that is, the wall 51b closer to the axial center of the spool core 53. However, it is possible to dispose the claw 55 on the wall 51b, and the ribs 56 on the wall 51a in each slit 51.

Figure 19:
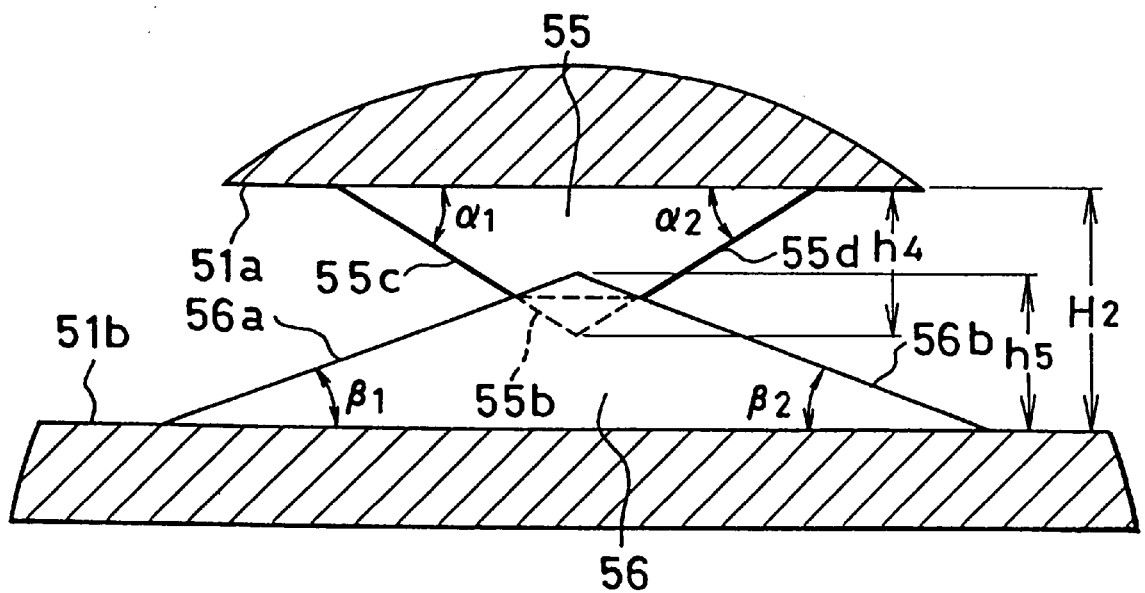
FIG. 19 is a sectional view taken along a IIX—IIX of FIG. 16.

The ribs 56 and the claws 55 have symmetrical triangular crest lines 56a and 56b; 55c and 55d, respectively, which extend in radial directions of the spool core 53, as shown in FIGS. 17 and 19. In other words, the crest lines 55c and 55d of the claw 55 form an equal angle α1=α2 to each other with the wall 51a, and the crest lines 56a and 56b of the rib 56 form an equal angle β1=β2 to each other with the wall 51b. Therefore, the light-shielding paper 24 can smoothly be inserted into either of the slits 51 from either entrance.

Providing that the claw 55 has a height h4 from the wall 51a, that the ribs 56 have a height h5 from the wall 51d, that the side projections 55a and 55b have a thickness t2, and that the walls 51a and 51b have a distance H2 from each other, it is desirable to satisfy the following condition: H2+t2<h4+h5<·H2.

In particular, H2 is most preferably 1.8 mm to 2.8 mm, whereas h4+h5 is most preferably H2+t2+(0.1 mm to 0.3 mm). In other words, it is most preferable that the claw 55 and the ribs 56 overlap each other in the width direction of the slit 51 by an amount t2+(0.1 mm to 0.3 mm).

Figure 20:
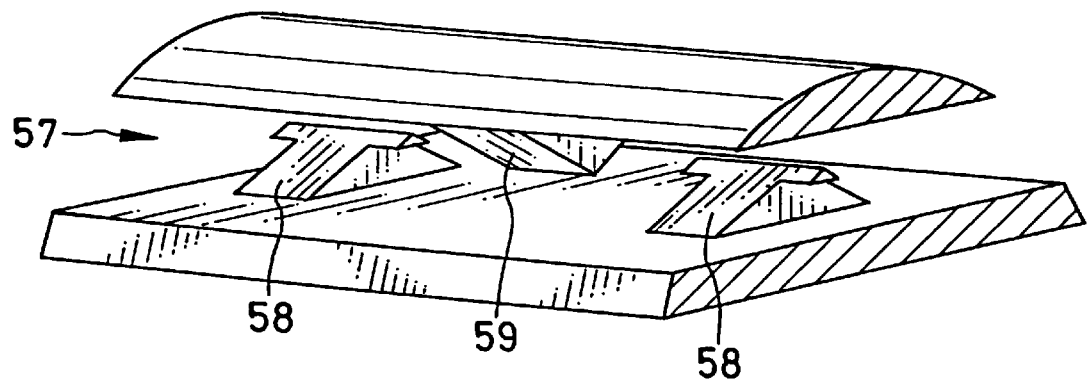
FIG. 20 is a view similar to FIG. 17, but showing another embodiment of the invention wherein a pair of claws and a rib are formed in a slit of a spool.
Figure 21:
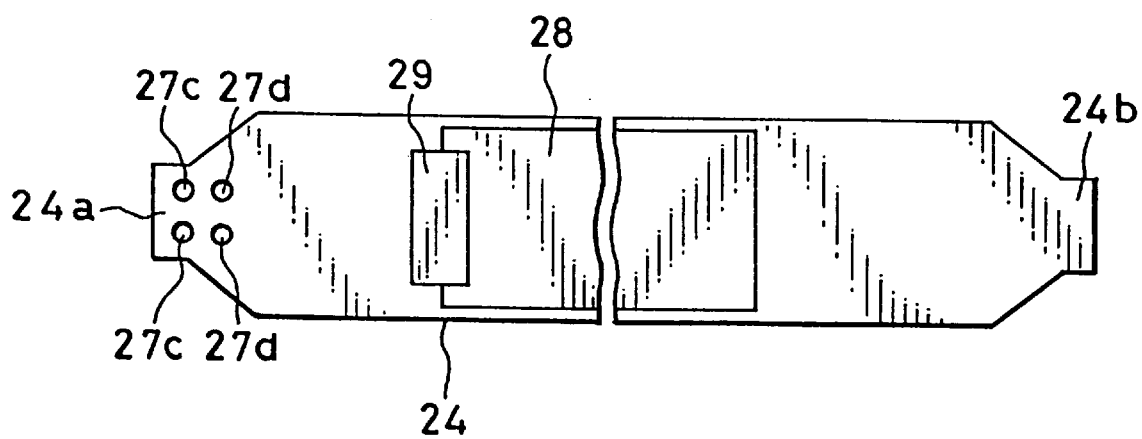
FIG. 21 is a plan view of a 120-size film for use with the spool of FIG. 20.

In alternative, an engaging slit 57 may have a pair of claws 58 on opposite lateral sides of a single rib 59 with respect to the film inserting direction into the slit 57, as is shown in FIG. 20. For use with this embodiment, a pair of holes 27c or two pairs of holes 27c and 27d are to be formed through the leader 24a of the light-shielding paper 24, as shown in FIG. 21, wherein the two holes 27c or 27d of each pair are disposed side by side in the lateral direction of the light-shielding paper 24, that corresponds to the film inserting direction.

Figure 22:
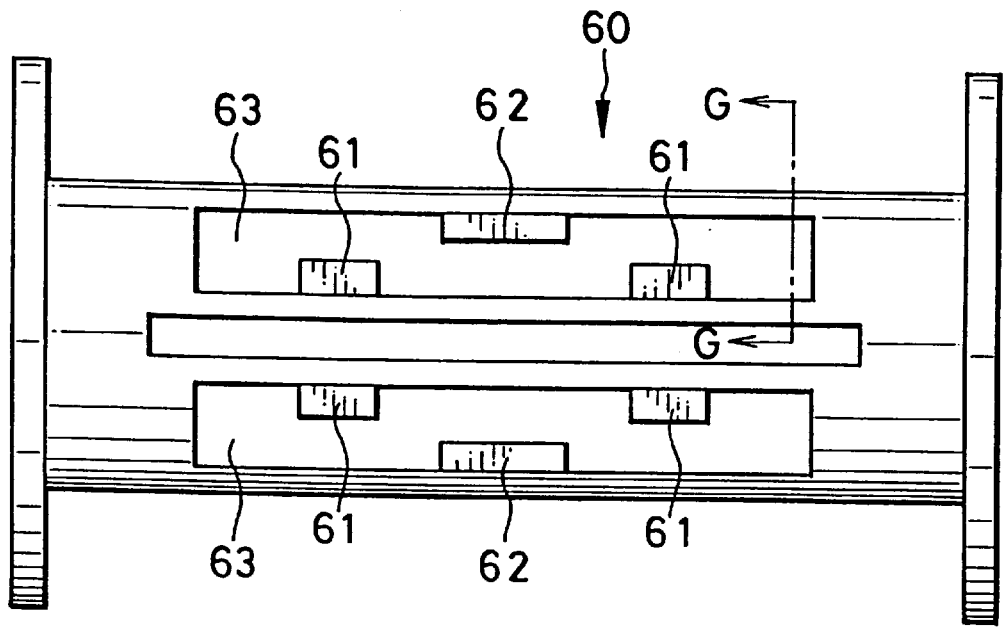
FIG. 22 is a front view of a spool according to a fourth embodiment of the invention.
Figure 23:
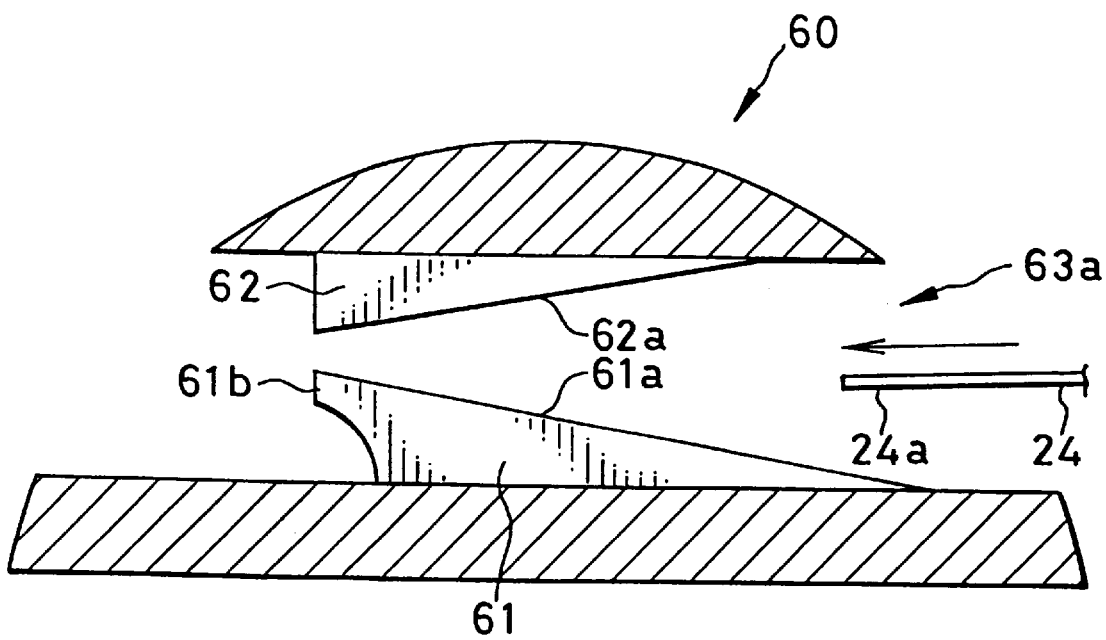
FIG. 23 is a sectional view taken along a line G—G of FIG. 22.

FIGS. 22 and 23 show another embodiment of the invention, wherein a spool 60 has a pair of claws 61 and a rib 62 in each of two engaging slits 63 which are disposed on opposite sides of a center plane slit 64. Moreover, the claws 61 and the rib 62 have a single guide surface 61a or 62a each, to permit insertion of the leader 24a of the light-shielding paper 24 from an entrance 63a of the slit 63, as is shown in FIG. 23. The leader 24a is guided along the guide surfaces 61a and 62a till a pair of holes of the leader 24a, like 27c or 27d of FIG. 21 are caught on hook portions 61b of the claws 61.

The present invention should not be limited to the embodiments as described so far. For example, the triangular pyramid like rib 42 may be replaced by a semi- or half-conical rib. The guide surfaces of the claw that face the entrances of the slit may have three or more different inclination surfaces, or may be a curved surface. In that case, the above inclination angle θ is assumed to be a tangential angle at the final contact point P2.

Meanwhile, it is well-known that ISO 135 film has film data such as film speed data recorded or printed on its cassette shell, so that a camera can read the film data to use for controlling exposure automatically. However, the conventional 120- and 220-size roll films have no such mechanically readable film data, so that the photographer must manually adjust the camera to the type of the 120- or 220-size roll film. It has been desired to provide the 120- and 220-size roll films with film data to permit automatic exposure control of the camera.

Figure 24:
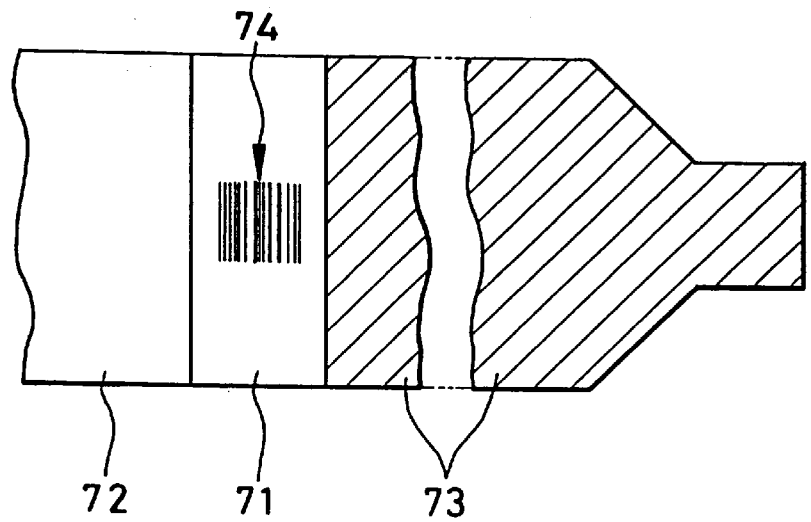
FIG. 24 is a plan view, partly cut away, of a leader of a 120-size film with a bar code, according to an embodiment of the invention.
Figure 25:
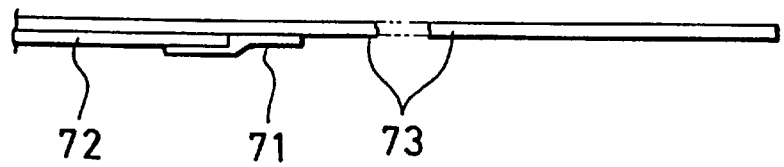
FIG. 25 is a side view of the film shown in FIG. 24.

FIG. 24 shows a 120-size photographic film having film data recorded thereon, according to a preferred embodiment of the invention. As shown from a lateral side in FIG. 25, a Brownie size filmstrip 72 is secured at its leading end to a light-shielding backing paper 73 with an adhesive tape 71. And a bar code 74 is printed on the outer surface of the adhesive tape 1. In a 220-size photographic film, it is preferable to provide a bar code on one of two adhesive tapes which secures a leading end of a filmstrip to a leader. The bar code 74 preferably includes film data such as film speed data, from ISO 25 to ISO 3200, film size data to discriminate between 120-size or 220-size, film type data to discriminate between a color photography film and a blackand-white photography film, and between a reversal film and a negative film, and so forth. Since the camera can read from the bar code 74 the film data indispensable for automatic exposure control of a camera, including the film speed, film size and film type data, the camera can automatically control exposure with respect to the 120-size or 220-size film, like 135-size photographic film.

Providing the bar code 74 on the adhesive tape 71 in a leading portion of the film is preferable because of the following reasons:

(1) The bar code 74 may be used for detecting the start of the camera in addition to film data detection;
(2) As the adhesive tape 71 of the leading portion of the film is opposed to an optical system of the camera when the rolled film is loaded in the camera, it is possible to provide a data reading device on one side of the optical system without the need for a large change in the camera construction;
(3) The adhesive tape 71 may have a bright color such as white that facilitates printing of the bar code 74; and
(4) The bar code 74 can be printed on the adhesive tape 71 in the same manufacturing line as film winding.

It is possible to provide film data in form of a DX code or a CAS (Camera Auto Sensing) code which is constituted of a pattern of conductive segments and isolated segments, and is electrically readable. In either case, the code on the adhesive tape 71 may be used for the camera to detect the start of film preliminary winding, in addition to film data detection. And the DX code or the CAS code can be provided by pattern printing. However, pattern printing of conductive segments is expensive compared with bar code printing. Moreover, electric contacts of the camera for use in detecting the DX or CAS code can scratch the photosensitive emulsion surface of the filmstrip 2, for example, if the contacts protrude toward the filmstrip 2. It is to be noted that the conductive segments of the CAS code are arranged in checkers, while the conductive segments of the DX code are arranged in stripes.

Figure 26:
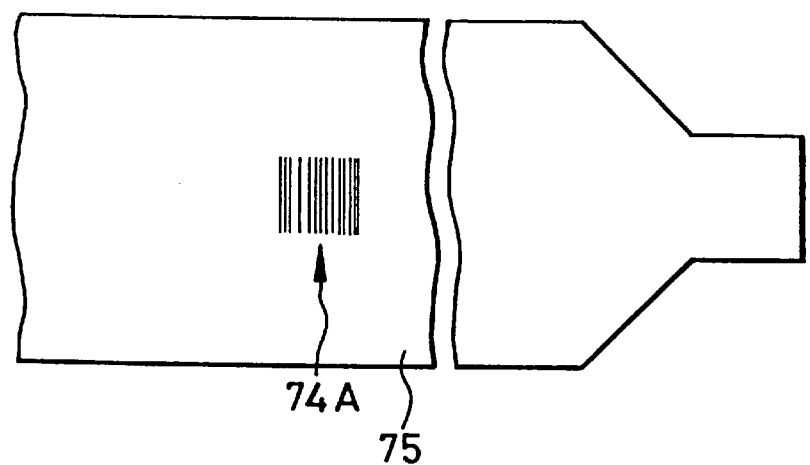
FIG. 26 is a plan view, partly cut away, of a leader of a 120-size film with a bar code, according to another embodiment of the invention.
Figure 27:
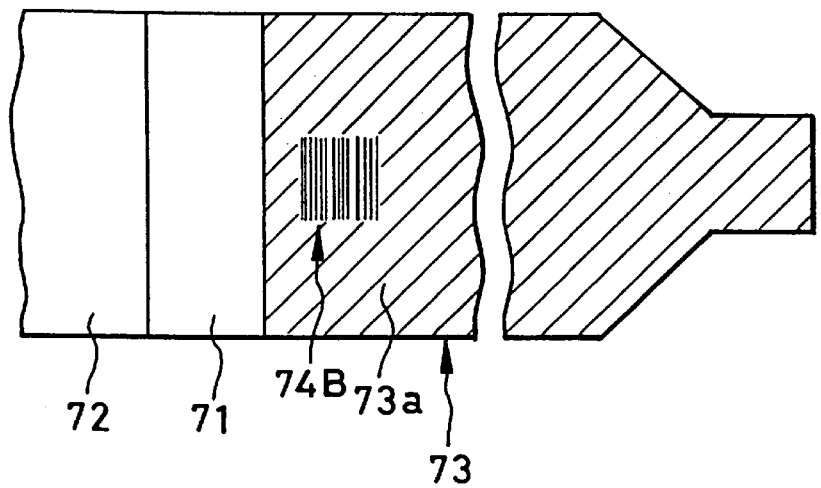
FIG. 27 is a plan view, partly cut away, of a leader of a 120-size film with a bar code, according to another embodiment of the invention.

FIG. 26 shows another embodiment of the invention wherein a bar code 74A is provided on a reverse surface 75 of a light-shielding paper 73 in a leading portion thereof. Although this embodiment is illustrated as a 120-size film in FIG. 26, this embodiment is applicable to a 220-size film.

It is preferable to provide a printing area on the reverse surface 75 to facilitate printing. Also in this embodiment, the bar code 74A can be printed in the same manufacturing line as film winding. However, to use the bar code 74A additionally for start detection, it is necessary to provide a specific data reading device, for example in a holder in Omega type cameras. In forward winding type cameras where the film is advanced one frame after each exposure from a film supply chamber to a film take-up chamber, the data reading device must be provided on the inside of a rear lid or the film supply chamber or the take-up chamber, since the reverse surface 75 faces the rear side of the camera.

It is possible to provide an electrically readable code constituted of conductive segments and isolated segments by pattern printing, instead of the bar code 74A. However, also in that case, to use the code additionally for start detection, it is necessary to provide a specific data reading device, for example in a holder in Omega type cameras, or on inside of a rear lid or a film supply chamber or a take-up chamber in the forward winding type cameras. Because the 120-size and the 220-size roll films have different roll diameters, it is difficult to use a common electric contact to read the code on both types. Besides being costly, it is necessary to provide an optical position detecting device if the electric data reading device is disposed on the inside of the rear lid.

It is possible to provide a bar code 74B on an obverse surface 73a of a light-shielding paper 73 on which a filmstrip 72 and an adhesive tape 71 are disposed. As implied by hatching, the obverse surface 73a has a dark color such as black for enforcing the light-shielding effect on the filmstrip 72. It is desirable to dispose the bar code 74B in a leading portion of the film, for the same reason as described above. As the obverse surface 73a is opposed to the optical system of the camera, it is possible to provide a bar code reading device on one side of the optical system without the need for a large change in the camera construction. However, indeed it is possible to print the bar code 74 on the obverse surface 73, but it is necessary to print a bright background area behind the bar code 74B, or to use matt ink for printing the bar code 74B. This would rise the printing cost. To reduce the cost, it is possible to replace the bar code 74B with a punched pattern which is optically readable through a transmission type photo sensor or the like. When punching the light-shielding paper, it is necessary to design the light-shielding paper and the punched pattern so as to keep a sufficient mechanical strength of the roll film.

It is possible to provide an electrically readable code constituted of conductive segments and isolated segments by pattern printing, instead of the bar code 74B. However, pattern printing of conductive segments is costly compared with bar code printing. Moreover, electric contacts of the camera for use in detecting the electrically readable code can scratch the photosensitive emulsion surface of the filmstrip 2.

Figure 28:
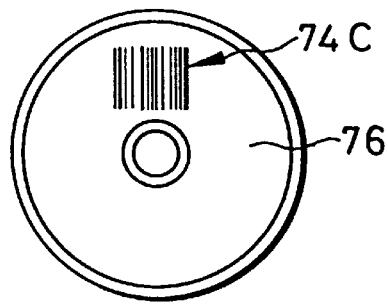
FIG. 28 is a view illustrating an end face of a flange of a spool with a bar code.
Figure 29:
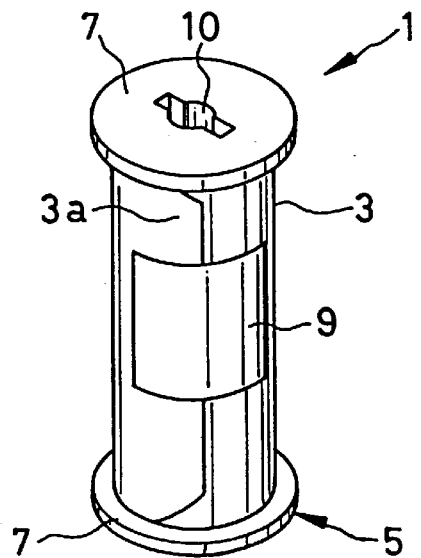
FIG. 29 is a perspective view of a roll film relating to the invention.
Figure 30:
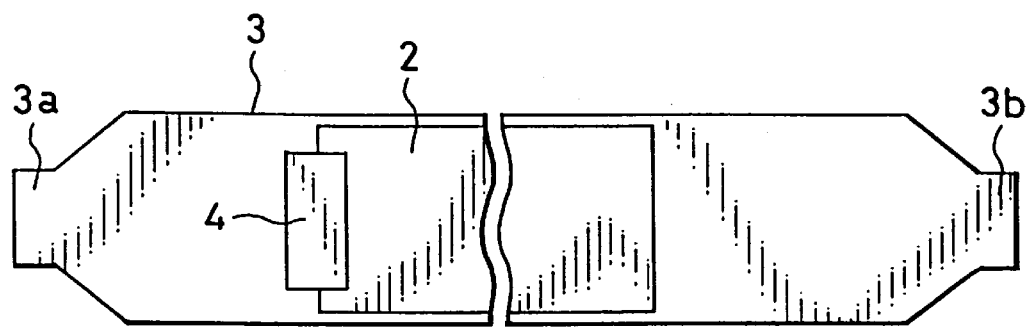
FIG. 30 is a plan view of a standard 120-size film.
Figure 31:
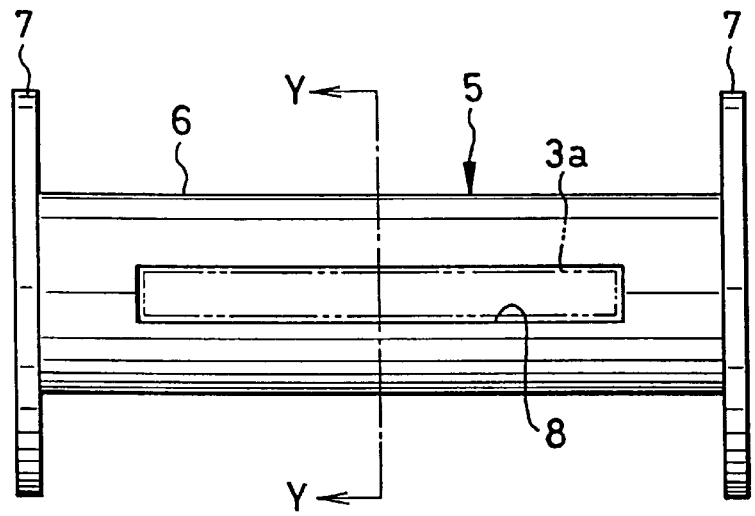
FIG. 31 is a front view of a conventional spool.
Figure 32:
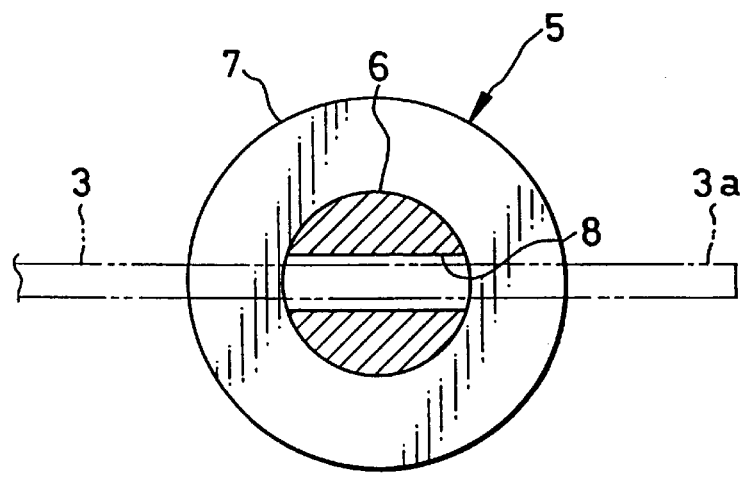
FIG. 32 is a sectional view taken along a line Y—Y of FIG. 31.

FIG. 28 shows a further embodiment of the invention wherein film data 74C is provided on an end face of a flange 76 of a spool. In this embodiment, a data reading device may be easily disposed in a film supply chamber of a conventional camera. As the film data 74C, a bar code can be printed with each on the end face of the flange 76. However, it is hard to use the film data 74C on the flange 76 for start detection by the camera. Therefore, this embodiment is disadvantageous in view of cost.

It is also possible to provide the film data 74C as an electrically readable code such as a DX code or a CAS code by pattern printing. In this case, an electric data reading device can easily be disposed in proximity to the key shaft of the film supply chamber. However, since it is hard to use the film data 74C on the flange 76 for start detection by the camera, this embodiment is disadvantageous in view of cost.

Accordingly, it is most preferable to print a bar code on the adhesive tape 71. In the bar code, data pieces may be arranged in an appropriate sequence in the bar code. For example, camera start data, film speed data, film size data, film type data, and end data are preferably arranged in this order from the leader of the film. It is also possible to provide clock data track in parallel with film data track in the bar code. The bar code may be those defined according to JIS B9550-1978. It is possible to provide the bar code by putting labels with bar codes to the light-shielding paper or the adhesive tape or the spool. But it is preferable to provide the bar code directly by off-set or gravure printing, ink jet printing or hot-stamping.

EXAMPLE

The followings are compositions of a preferred example of roll film according to the invention.

The light-shielding paper was composed as follows:

A base paper of 75 $\mu$m to 80 $\mu$m and 80 g/m$^2$ was made from a mixed pulp consisting of 30% conifer pulp and 70% latifoliate tree pulp, added with cation polyacryl amide as a paper pulp reinforcer, rosin derivative as a sizing agent, aluminum sulfate as a bonding agent, and polyvinyl-alcohol containing calcium carbonate and titanium oxide as a surface sizing agent, by means of a wire paper machine. A light-shielding film of 20 μm was made from LDPE containing 18 wt % acetylene black by an inflation method. The light-shielding film was cemented to the base paper with a polyurethane dry laminating adhesive, and a gravure printing was made on the base paper surface with an ink consisting of polyamide/pyroxylin resin mixture and a pigment as a coloring agent. The printed surface was coated with 1 μm to 2 μm polymethyl-methacrylate as an overcoat or protection layer by gravure printing, thereby providing the light-shielding paper having a total thickness of 100 μm to 105 μm.

As the photographic filmstrip, a photographic film having a total thickness of 95 μm and a film speed of ISO 400 was used.

Adhesive tape was composed as follows:

A base layer was made from a mixed pulp consisting of 20% conifer pulps and 80% latifoliate tree pulps, added with cation-polyacrylamide as a paper pulp reinforcer, rosin derivative as a sizing agent, aluminum sulfate as a bonding agent, by means of a wire paper machine and, thereafter, the base layer was coated with a white layer of 12 μm consisting of kaoline, calcium carbonate and titanium oxide dispersed in polyvinyl-alcohol and acrylic emulsion, to provide a base paper having a total thickness of 100 μm. Then, a layer of 30 μm isoprene group adhesive is formed as a pressure-sensitive adhesive on the opposite surface of the base paper from the white layer. The bar code was printed on the white layer by hot-stamping for the adhesive tape to be used in the leading portion of the film.

To manufacture a 120-size photographic film, the photographic filmstrip was attached to a center area of the light-shielding paper and was secured at its leading and trailing ends with the adhesive tapes.

The base paper for the light-shielding paper of the roll film of the invention may be any of those which are made mainly from natural pulps, or from a mixture of natural pulps and synthetic fibers or pulps at an appropriate mixture ratio. It is also possible to make the base paper from pulps mixed with reprocessed pulps or to use multi-layered paper consisting of reprocessed pulp layers and natural pulp layers.

Preferable natural pulps are kraft pulps of conifer, latifoliate tree, or mixture thereof. As natural pulps for use with kraft pulps, sulfide pulps are preferable, but high-yield pulps such as SCP, CGP, TMP, RGP are applicable.

Various additive agents may be loaded in the base paper during adjustment of slurry of paper materials. It is particularly preferable to load some of the following agents:

Sizing agents: fatty acid metal salt and/or fatty acid, alkyl-ketene emulsion dimer or epoxy high-fatty acid amide that is disclosed in JPB62-7534, alkenyl- or alkyl-succinic acid anhydrous emulsion, and rosin derivative;

Dry paper reinforcer: anion-, cation- or ampholytic polyacryl amide, polyvinyl alcohol, cationic starch (e.g. JPA3-171042), and vegetable galacto mannan;

Wet paper reinforcer: polyamine-polyamide and epichlorohydrin resin;

Filler: clay, kaolin, calcium carbonate, titanium oxide etc.;

Bonding agents: water-soluble aluminum salt such as aluminum chloride and alumina sulfate;

pH adjuster: caustic soda, sodium carbonate, sulfuric acid etc.; and

Coloring pigment, coloring dye and/or fluorescent brightener such as disclosed in JPA63-204251 and JPA1-266537.

The base paper may further contain various additive agents such as water-soluble polymer, latex, emulsion and anti-static agents by coating, spraying, tab sizing, size press or other method.

As water-soluble polymer, there are starch polymer that is disclosed in JPA1-266537, polyvinyl alcohol polymer, gelatin polymer, polyacrylamide polymer, cellose polymer. As anti-static agents, there are conductive materials including non-ionic surface active agent such as polyoxyethylene glycol, cation surface active agent such as quaternary ammonium salt, ampholytic surface active agent, alkyl amine derivative, fatty acid derivative, several kinds of lubricant, carbon black, graphite, metallic surface coating pigment, metallic powder, metallic flake, carbon fiber, metallic fiber, whisker (potassium titanate, alumina nitride, and alumina). As concrete components, there are alkaline metal salt such as sodium chloride and potassium chloride, alkaline earth metal salt such as calcium chloride and barium chloride, colloid metallic acid such as colloid silica, and organic anti-static agent such as polystyrene sulphonate.

As latex or emulsion, there are petroleum resin emulsion, and latex such as styrene-acrylic acid-acrylic ester copolymer, styrene-acrylic acidbutadiene copolymer, ethylene-vinyl acetate copolymer, and styrene-maleic acid-acrylic ester copolymer. As pigment, there are clay, kaolin, talc, barium sulfate, titanium oxide. As pH adjuster, there are hydrochloric acid, phosphoric acid, citric acid and caustic soda.

The base paper may have a complete light-shielding property by itself, or a light-shielding layer may be additionally formed on the base paper. In either case, the base paper may be a black paper to supplement the light-shielding effect. The black paper preferably contains 1 wt % to 15 wt % furnace carbon black having an average particle diameter of 15 μm to 80 μm and 0.1 wt % to 10 wt % synthetic zeolite having an average particle diameter of 0.1 μm to 5 μm. The base paper may further contain 0.01 wt % to 5 wt % cationic water-soluble polymer and 0.1 wt % to 2 wt % cationic black or blue dye (dye whose coloring portion is loaded with positive electric charge, such as diallyl methane, triallyl methane, thiazole, methine, xanthene, oxazine, thiazine, azo, and anthraquinone).

The base paper is made from the paper material slurry loaded with the additive agents according to an appropriate paper making method such as disclosed in JPA58-37642, JPA61-260240 and JPA61-284762, by use of a conventional paper machine such as a wire paper machine or a cylinder paper machine, so as to obtain equal formation, and thereafter is subjected to calendaring by use of machine calender, super calender or thermal calender, to have a weight of 50 g/m$^2$ to 100 g/m$^2$, preferably 60 g/m$^2$ to 90 g/m$^2$, and a thickness of 45 μm to 120 μm, preferably 60 μm to 100 μm. Regarding physical properties, it is preferable that the base paper has a smoothness of 90 seconds or more, preferably 120 seconds or more in the Beck smoothness that is defined in JIS P-8119 so that the photographic film may not suffer scratches, pressure fogging or other damage from unevenness of the light-shielding paper surface, and that the gap between the photographic film and the light-shielding paper may be minimized to improve light-shielding properties and moisture barrier properties. The base paper preferably has an air permeability of 500 seconds or more when measured according to JIS P-8117, and a sizing degree of 10 seconds or more in Stöckigt sizing degree (JIS P-8122) in view of after-processing, or to give a sufficient water- and moisture-resistance to the light-shielding paper.

For the present invention, tensile strength at break of the hole of the light-shielding paper in relation to the claw of the spool is an impotent factor. Since it is desirable that the load applied during the film winding is about 200 g to 300 g to draw the film, and that engaging force is 500 g or more. Therefore, the base paper preferably has a tensile strength of 4.5 Kgf/15 mm or more in the longitudinal direction (JIS P-8113) and a tearing strength of 35 gf or more (JIS P-8116).

As thermoplastic resins for forming the light-shielding layer on the rear surface of the base paper, those disclosed in U.S. Pat. Nos. 2646365, 2646366, 2751309, and 2959492, FR-1449852, JPA51-49205, JPA48-22020, JPA50-67644, JPA55-140835, JPA58-17434, JPA58-186744, JPA59-68238, JPA60-35728, JPA6-51450 etc. are applicable. That is, one of polyolefin group resin such as several kinds of low-, middle- and high-density polyethylene, and linear low density polyethylene and polypropylene; polyvinyl group resin such as ethylene vinyl acetate; acrylic resin such as ethylene ethyl acrylate and ethylene methyl acrylate; rubber resin such as styrene butadiene; monomer such as ionomer; graft copolymer polyamide group resin; and polyester resin such as polyethylene terephthalate; or a blend or copolymer of two or more of these resins. It is also possible to form more than one resin layer overlaid on the rear surface of the base paper.

As the light-shielding material added to the resin, carbon black, titanium nitride and graphite are preferable as light-absorbing light screen materials having superior light-shielding properties. Among these, carbon black is preferable in view of light-shielding properties, cost and physical properties, of which furnace carbon black is popular and preferable, but channel carbon black or thermal carbon black is also applicable. Acetylene carbon black and Ketchen carbon black being a denatured by-product, are preferable because of their light-shielding properties as well as anti-static properties.

Considering the use in the light-shielding paper for photographic film, carbon blacks are required to have smaller unfavorable effect on the photographic film, such as fogging and disordering of film sensitivities, but provide sufficient light-shielding effect. In this point of view, preferred are those furnace carbon blacks of pH 6.0 to 9.0, having an average particle diameter from 10 $\mu$m to 120 $\mu$m, more preferably from 15 $\mu$m to 100 $\mu$m, and most preferably from 20 $\mu$m to 80 $\mu$m, a volatile content of 2.0% or less, more preferably 1.0% or less, and most preferably 0.5% or less, and an oil-absorption factor of 50 ml/100 g or more, more preferably 70 ml/100 g or more, and most preferably 100 ml/100 g or more, because they are not apt to provide pin holes, hard spots or fish-eyes in resin film or coat, and improve light-shielding properties and dispersing properties, as well as less adversely affect photographic properties and physical properties.

Representative examples of preferred carbon blacks on the market include Carbon Black #20(B), #30(B), #33(B), #40(B), #41(B), #44(B), #45(B), #50(B), #55(B), #100(B), #600(B), #2200(B), #2400(B), MA8, MA11 and MA100, all produced by Mitsubishi Kasei Corporation; Black Pearls 2, 46, 70, 71, 74, 80, 81 and 607, Regal 300, 330, 400, 660, 991 and SRF-S, Vulcan 3 and 6, Sterling 10, SO, V, S, FT-FF and MT-FF, all produced by Cabot Co., Ltd.; and UNITED R, BB, 15, 102, 3001, 3004, 3006, 3007, 3008, 3009, 3011, 3012, XC-3016, XC-3017 and 3020, all produced by Ashland Chemical Co. However, the carbon black is by no means limited to these examples.

There are mainly three methods of forming on the base paper a resin layer containing 4 wt % to 30 wt % light-shielding material as above.

One is coating and drying a liquid of the resin dispersed or solved in an organic solvent or water. The liquid may be coated by reverse roll coating, blade coating, air knife coating, rod coating, flood coating, extrusion coating, gravure coating, or any other appropriate coating method. According to this method, the thickness of the consequent dried resin coat is appropriately 1 $\mu$m to 25 $\mu$m.

Another is hot-melt coating of the resin, wherein extrusion coating is usual, but any other method is applicable. According to this method, the thickness of the consequent dried resin coat is appropriately 5 $\mu$m to 60 $\mu$m.

The third method is forming a uniform resin film of 20 $\mu$m to 40 $\mu$m by inflation, T-die, casting, or rolling, and then cementing the resin film to the base paper by dry lamination with a polyurethane group or a polyether group adhesive at a thickness of 1 $g/m^2$ to 3 $g/m^2$. Any of the above methods is applicable to the light-shielding paper of the present invention.

The ink for use in printing information such as the bar code and decorative patterns on the light-shielding paper may be selected among from widely used inks for off-set printing or gravure printing and UV inks, but those having no harmful influence on photographic materials.

Representative examples of appropriate synthetic resin for ink are vinyl chloride/vinyl acetate resin copolymer; nitrate pyroxylin, polyester; polyamide urethane; polyacryl; rosin denatured maleic acid; ethylene-vinyl acetate; vinyl ether; urethane-vinyl acetate; vinyl acetate-urethane resin; modified alkyd resin, modified phenol resin; alkaline soluble resin including rosin modified maleic acid resin, styrene maleic acid resin, styrene acrylic resin, acrylic ester acrylic resin, and methacrylic ester acrylic resin; hydrosol-type resin including styrene maleic acid resin, styrene acrylic resin, a-methyl styrene acrylic resin, acrylic ester acrylic resin, and methacrylic ester acrylic resin; emulsion-type resin including styrene resin, styrene acrylic ester resin, acrylic ester copolymer resin and methacrylic ester copolymer resin. As resins for ultraviolet ink, polymers with acrylic unsaturated group are usual. Representative examples are polyester/acrylic ester, polyester/urethane resin/acrylic ester, epoxy resin/acrylic ester, pentaerythritol triacrylate, trimethylol propane triacrylate, hexane diol diacrylate, triethylene glycol diacrylate, triethylene glycol diacrylate, and hydroxy ethyl methacrylate.

These inks are used with well-known colorant. Examples of these colorants are several kinds of pigments disclosed in JPA63-44653 and so forth:

Azo-pigments: azo lake such as carmine 2B, red 2B; insoluble azo such as monoazo yellow (PY-1, -3), disazo yellow (PY-12, -13, -14, -17, -83), pyrazolone orange (PO-B-34), Balkan orange (PO-16); overall azo group such as chromophthal yellow (PY-93, -95), chromophthal red (PR-144, -166);

Polycyclic pigments: phthalocyanine group such as copper phthalocyanine blue (PB-15, -15-1, -15-3), copper phthalocyanine green (PG-7); dioxazine group such as dioxazine violet (PV-23); isoindolinone group such as isoindolinone yellow (PY-109, -110); durene group such as pellilene, perinone, flavanthrone, thioindigo; lake pigments such as malachite green, rhodamine B, rhodamine G, Victoria blue B;

Inorganic pigments: oxide such as titanium dioxide, blood red; sulfate such as sedimentary barium sulfate; carbonate such as sedimentary calcium carbonate; silicate such as hydrous silicate, anhydrous silicate; metal powder such as aluminum powder, bronze powder, zinc powder, carbon black, chrome yellow, iron blue etc. These pigments are applicable as light-shielding materials for the above-described resin or the paper layer. In addition, oil-soluble dye and dispersing dye are applicable. The ink may further contain several kinds of solvents, dispersing agents, wetting agents, anti-foaming agents, leveling agents, tackifier, stabilizer, cross-linking agents, wax, drier.

It is possible to use an ink jet printing method for bar code printing. For ink jet printing, there are generally aqueous ink and solvent type (oil-soluble) ink. The aqueous ink may contain water-soluble dye as colorant, water as solvent, monohydric- and dihydric alcohol as water-soluble solvent, polyhydroxy alcohol, water-soluble nitride composition or moisture-absorbing organic composition as a wetting agent. As the oil-soluble ink, those are applicable which contain an oil-soluble dye as colorant, and low water-soluble solvent such as glycol ether and ester, or water-insoluble solvent such as isoparaffin as solvent, and whose viscosity is controlled in a range from 2 to 10 centipoise.

It is also possible to provide the bar code by hot-stamping. In that case, the bar code is formed on a heat-transfer film, and is transferred to the designated position on the roll film.

Good examples of ink for hot-stamping are those which use heat-resistant pigments such as carbon black, iron blue, phthalocyanine blue, lake red G, calcium carbonate, alumina white, clay, titanium dioxide, and are also loaded with extender pigments such as silica and barium sulfate for improving cutting properties, and pigments with smaller oil-absorbing factor. As the resin for the hot-stamping ink are applicable the followings: hard resins such as rosin ester, terpene phenol, petroleum resin; acrylic copolymer, ethylene-vinyl acetate copolymer, cyclic rubber, vinyl chloride-vinyl acetate copolymer, wax monomer or wax mixture such as natural carnauba wax, montan wax, synthetic wax, low-molecular polyethylene etc.

Where the bar code is to be printed either on the black obverse surface of the light-shielding paper or on the spool, it is necessary to print a background area in white, yellow or silver. Thereafter, the bar code is printed in black or a dark color, or as blank segments.

In this embodiment, those inks are preferable which use inorganic pigments such as titanium oxide, clay, mica, alumina, calcium silicate, aluminum hydroxide, calcium carbonate, barium sulfate; or metallic powder pigments such as aluminum powder, bronze power.

It is possible to coat the light-shielding paper with a protection layer called lacquer coat or varnish for surface glossing as well as for protection of the printed area. As the protection layer, an appropriate one or more of various resins are applicable, including acrylic resin, cellulose resin such as acetate fibrous material, urethane resin, epoxy resin, polyester resin, ionomer resin, EEA resin, various polyethylene resin including low density-, high density- and linear low density polyethylene, polypropylene resin etc. Wax is also applicable.

Stiffness is another important property of the light-shielding paper. A certain stiffness is necessary to permit and facilitate insertion of the light-shielding paper into the slit of the spool, while the light-shielding paper must be soft and flexible to permit tight winding and prevent unwinding.

Accordingly, the stiffness of the light-shielding paper is preferably 100 mgf to 200 mgf, and more preferably 120 mgf to 160 mgf in Gurley stiffness.

The light-shielding paper for use in the invention may be light-tight black paper or those consisting of base paper and a carbon black dispersed resin layer coated or laminated on the base paper. The light-shielding paper should be capable of bearing bar codes, electrically readable codes or the like thereon by printing or sticking.

Particular examples of the light-shielding paper are as follows:

A light-shielding paper provided with at least an aluminum layer on base paper, which prevents sticking of the light-shielding paper with the photographic film in hot and humid conditions, gas fogging of the photographic film, clockspringing or unwinding of the roll that could be caused by a high stiffness in flexure, and dimensional instability that could be caused by moisture absorption, as disclosed in JPA55-140835 and JPB6-136216;

A light-shielding paper provided with a layer consisting of high density polyethylene and low density polyethylene so as to improve antistatic properties and cutting properties on punching, as disclosed in JPA60-35728;

A light-shielding paper provided with a lamination film consisting of ethylene polymer, acrylic ester, methacrylic ester, and vinyl acetate/ethylene copolymer, so as to improve low temperature heat sealing capacity, mixed material sealing capacity and cutting properties, as disclosed in JPA59-68238;

A light-shielding paper which prevents neck-in on melt extrusion of middle and surface layers on the base material, as disclosed in JPA58-186744;

A light-shielding paper which has a polyolefin or polyolefin mixture layer on one or each side, as disclosed in JPA58-17434;

A light-shielding paper provided with a paint having an absorption band in a wavelength range of not less than 550 $\mu$m to improve light-shielding capacity, as disclosed in JPA52-150016;

A light-shielding paper coated with copolymer of methyl methacrylate, methacrylic acid, ethyl acrylate and so forth, as disclosed in JPA50-67644;

A light-shielding paper coated with copolymer of ethylene and at least one of acrylic ester and methacrylic ester, as disclosed in JPA48-22020 and JPB51-49205;

A light-shielding paper provided with a plurality of carbon black layer on the base paper, as disclosed in U.S. Pat. No. 871004;

A light-shielding paper provided with printing on one surface, and a carbon black containing polyethylene layer on the opposite surface by extrusion laminating, as disclosed in U.K.P. No. 1156302;

A light-shielding paper provided with a protection layer on the printed surface, and a carbon black containing vinylidene chloride or styrene/butadiene copolymer layer on the opposite surface, as disclosed in U.S. Pat. Nos. 2646365, 2646366, 2751309, 2959492 and 3053779;

A light-shielding paper provided with carbon black containing polyethylene on its surfaces by extrusion, as disclosed in French Patent No. 1449852 and U.K.P. No. 1071032; and A light-shielding paper coated with a mixture of ethylene-vinyl acetate copolymer and carbon black, as disclosed in German Patent No. 1903378.

As the adhesive tapes, those are applicable which permit printing or stamping bar codes or conductive segments and isolated segments on one side of a base material such as paper and plastic film, and which are provided with a pressure-sensitive adhesive on the opposite side of the base material. Good examples of the pressure-sensitive adhesive are rubber-based adhesives composed of rubber, such as styrene-isoprene-styrene block copolymer, styrene-butadiene rubber, polybutene rubber, polyisoprene rubber, butyl rubber, natural rubber and synthetic isoprene, loaded with tackifying resin to control glass transition temperature, such as rosin, dammar, copal, hydrogenated rosin, rosin ester, indene-coumarone, picopal, polyterpene, nitrocelullose, alkyd resin, buton and xylene resin, softening plasticizer such as DOP, TCP, DBP and BBP, paraffm chloride, animal and vegetable fats and oils, and mineral oils; acrylic pressure-sensitive adhesive composed of homopolymer or copolymer solved in an appropriate solvent, the homopolymer or copolymer being those of acrylic ester such as methyl acrylate, ethyl acrylate, butyl acrylate, hexyl acrylate, 2-ethyl-hexyl acrylate, isooctyl acrylate, octyl acrylate, decyl acrylate, or those of methacrylic ester such as methyl methacrylate, ethyl methacrylate, butyl methacrylate, hexyl methacrylate, 2-ethyl-hexyl methacrylate, isooctyl methacrylate, octyl methacrylate, decyl methacrylate; or copolymer of these ester compounds and vinyl compounds having functional group, such as acrylic acid, methacrylic acid, itaconic acid, crotonic acid and maleic acid. When copolymer with functional group is used, a small amount of isocyanate group organic cross-linking agent which acts on the functional group is loaded to increase heat-resiliency and cohesive effect.

In alternative, the adhesive tapes may be provided with heat-sensitive adhesives: those of polyolefin such as polyethylene; those of vinyl acetate copolymer such as ethylenevinyl acetate copolymer; those of acrylic ester copolymer such as ethylene-ethylene acrylate and ethylene-isobutyl acrylate; those of polyamide such as nylon 6, nylon 6.6, nylon 10, nylon 12 and N-methoxymethyl-nylon; terephthalate adhesives; polyester adhesives;

polyvinyl butyral adhesives; polyvinyl acetate adhesive; those of cellulose derivatives such as acetate, methyl cellulose, acetate-butyrate; those of polymethacrylic acid ester such as polymethyl methacrylate; those of polyvinyl ether such as polyvinylmethyl ether; polyurethane adhesive; polycarbonate adhesive; those of styrene block copolymer such as styrenebutadiene-styrene; those of synthetic rubber such as styrene-butadiene, isoprene and butyl rubber; those of special rubber other than the above; and a mixture of one or more of those acrylic copolymers other than the above.

For the spool of the roll film according to the invention, polystyrene resin is generally used because of its strength, heat-resistant properties, dimensional stability and appearance. Also a blend of general polystyrene resin (GPPS) and high impact or middle impact polystyrene resin (HIPS or MIPS) which is made by polymerizing styrene monomer with a synthetic rubber such as butadiene rubber, HIPS or MIPS alone, and a blend of GPPS with a rubber are applicable, of which the blend of HIPS and GPPS, or MIPS alone is preferable in view of impact strength and wearing resistance.

A preferable loading of the rubber is 0.5 wt % to 6.0 wt % considering the price, physical strength, injection molding facility, surface strength (resistance against scratch and wearing) and appearance. If the rubber loading is below 0.5 wt %, sufficient physical and surface strengths cannot be obtained. But above 6.0 wt %, injection molding facility, stiffness, appearance and price are too bad to use in practice.

For polymerization, any of three methods popular today is applicable: bulk polymerization wherein the monomer is polymerized without any solvent and dispersing agents, as is disclosed in JPA64-91136; random bulk polymerization as being generally industrialized wherein the monomer, catalyst and a small amount of solvent are used; and suspension polymerization wherein the monomer is dispersed in a medium in which the monomer is not or hardly soluble, and a polymerization initiator is used that is hardly soluble in the medium but easily soluble in the monomer.

Because the spool for the Brownie film should shield the photographic film from extraneous light in cooperation with the light-shielding paper, the spool must have light-shielding properties. Representative examples of light-shielding agents added to the resin for forming the spool are inorganic compounds as referred to below:

1) Oxide, such as: silica, diatomaceous earth, alumina, titanium oxide, iron oxide, zinc oxide, magnesium oxide, antimony oxide, barium ferrite, strontium ferrite, beryllium oxide, pumice stone, pumice stone balloon, and alumina fiber.

2) Hydroxide, such as: aluminum hydroxide, magnesium hydroxide, and basic magnesium carbonate.

3) Carbonate, such as: calcium carbonate, magnesium carbonate, dolomite, and danalite.

4) Sulfate and sulfite, such as: calcium sulfate, barium sulfate, ammonium sulfate, and calcium sulfite.

5) Silicate, such as: talc, clay, mica, asbestos, glass fiber, glass balloon, glass bead, calcium silicate, montmorillonite, and bentonite.

6) Carbon, such as: carbon black, graphite, carbon fiber, and carbon hollow sphere.

7) Other compounds, such as: iron powder, copper powder, lead powder, tin powder, stainless steel powder, pearlescent pigment, aluminum powder, molybdenum sulfide, boron fiber, zeolite, boron fiber, silicon carbide fiber, brass fiber, potassium titanate, lead titanate zirconate, zinc borate, barium methaborate, barium methaborate, calcium borate, sodium borate, and aluminum paste.

Among the above, carbon black is preferable, because it fogs less the photographic film, has little influence on photosensitivity and a great capacity for shielding light, and less produces spitting or hard spot in polystyrene resin.

Carbon black is classified according to raw materials as gas black, furnace black, channel black, anthracene black, acetylene black, Ketchen carbon black, thermal carbon black, lamp black, oil smoke, pine smoke, animal black, vegetable black, and so forth. Among of these, furnace black is preferable considering its light-shielding capacity and cost, as well as because it improves physical properties, and has less influence on photographic properties. Acetylene carbon black and Ketchen carbon black, a denatured by-product, are also preferable as having antistatic properties as well as light-shielding capacity, through they are expensive.

Among of the carbon blacks, those are preferable which is pH 6.0 to 9.0, and more preferably 6.5 to 8.5 (JIS K-6221), and having an average particle diameter of 10 $\mu$m to 120 $\mu$m, and more preferably 12 $\mu$m to 70 $\mu$m. Among of these, more preferred is furnace carbon black whose volatile component is not more than 3.5%, and most preferably 1.5% (JIS K-6221), and whose DBP oil absorption is not less than 50 ml/100 g, and most preferably not less than 70 $\mu$m(Method A of oil absorption measurement according to JIS K-6221). Channel carbon black is not preferable because it is expensive, and mostly contain more than 5.0% volatile component so that it can fog the photographic film. Most lamp black is pH 5.0 or less, so it has bad influence on the photographic properties. Therefore, if lamp black should have to be used, its influence on the photographic properties must be studied in advance. To evade adverse influence on the photographic properties, sulfur component of the carbon black should be 0.9% or less, and preferably 0.7% or less when measured according to ASTM D 1619-60. Especially, free sulfur component should preferably be 0.1% or less, and most preferably 0.05% or less.

Preferred examples of commercially available carbon black for the spool are the same as set forth above for the light-shielding paper.

A preferable loading of the furnace carbon black is 0.05 wt % to 3.00 wt %, in view of the price, physical strength of the spool, light-shielding capacity, influence on photographic properties of the film, injection molding facility, and appearance. Loading of less than 0.05 wt % furnace carbon black results in insufficient light-shielding capacity, so the photographic film is fogged, unless the spool is thick enough. Making the spool thick enough for obtaining sufficient light-shielding capacity with 0.05 wt % furnace carbon black elongates molding cycle so much that molding failure such as sink marks can be provided, in addition that it increases the necessary amount of resin and thus raises the material cost. Loading of more than 3.00 wt % results in raising the cost and lowering physical strength of the spool, and weld marks are liable to occur. Moreover, the spool tends to absorb moisture, which can adversely affect the photographic film, and deteriorate the appearance of the spool (silver streaking, uneven or lowered glossiness), and weaken the surface of the spool, i.e. the spool can easily get scratched or worn.

As the dispersing agent for the light-shielding agent, one or more of low molecular weight styrene polymer, polyethylene wax, polypropylene wax, derivatives of these compounds, ethylene-bis-amide group and metallic soaps is applicable. A preferable example is zinc stearate or magnesium stearate. Carbon black containing master-batch pellet can contain the dispersing agent to an extent that has no harm on the product. As for zinc stearate, however, a preferable range is 0.01 wt % to 0.3 wt % in the final molding product. If the loading of zinc stearate is more than 0.3 wt % of the final product, glossiness of the product and sweating on the metal molds are increased so much that obstacles may stick to the final molding product. However, loading of less than 0.01 wt % zinc stearate would have little dispersing effect.

The spool of the invention may contain lubricant, in order that the edges of the light-shielding paper may smoothly slide on the spool, and thus the tightness of the film roll on the spool may further be improved. Examples of lubricants applicable for this purpose are referred to below, as well as manufacturers thereof:

(1) Fatty acid amide lubricants:
  Saturated fatty acid amide lubricants:
    Behenic acid amide lubricants, such as DIAMIDE-KN (trade name; manufactured by Nippon Kasei Chemical Co., Ltd.); and
    Stearic acid amide lubricants, such as ARMIDE-HT (trade name; manufactured by Lion Oil and Fats Co., Ltd.), ALFLOW-S-10 (trade name; manufactured by Nippon Oil and Fats Co., Ltd.), fatty acid AMAMID-AP-1 (trade name; manufactured by Nippon Chemical Co., Ltd.), AMIDE-S AMIDE-T (trade name; manufactured by Nitto Chemical Industry Co., Ltd.), NEWTRON-2 (trade name; manufactured by Nippon Fine Chemical Co., Ltd.);
  Hydroxy stearic acid amide lubricants:
    Palmitic acid lubricants, such as NEWTRON-S-18 (trade name; manufactured by Nippon Fine Chemical Co., Ltd.), AMIDE-P (trade name; manufactured by Nitto Chemical Industry Co., Ltd.); and
    Lauric acid amide lubricants, such as ARMIDE-C (trade name; manufactured by loan Akzo Co., Ltd.), DIAMID (trade name; manufactured by Nitto Chemical Co., Ltd.);
  Unsaturated fatty acid amide lubricants:
    Erucic acid amide lubricants, such as ALFLOW-P-10 (trade name; manufactured by Nippon Oil and Fats Co., Ltd.), NEWTRON-S (trade name; manufactured by Nippon Fine Chemical Co., Ltd.), LUBROL (trade name; manufactured by I.C.I), and DIAMID-L-200 (trade name; manufactured by Nippon Chemical Co., Ltd.); and
    Oleic acid amide lubricants, such as ARMO SLIP-CP (trade name; manufactured by Lion Akzo Co., Ltd.), NEWT ON and NEWTRON-E-18 (trade names; manufactured by Nippon Fine Chemical Co., Ltd.), AMIDE-O (trade name; manufactured by Nitto Chemical Industry Co., Ltd.), DIAMID-O-200 and DIAMID-G-200 (trade names; manufactured by Nippon Chemical Co., Ltd.), ALFLOW-E-10 (trade name; manufactured by Nippon Oil and Fats Co., Ltd.), and fatty acid AMIDE-O (trade name; manufactured by Kao Corporation);
  Bis fatty acid amide lubricants:
    Methylene bis behenic acid amide lubricants, such as DIAMID-NK-BIS (trade name; manufactured by Nippon Chemical Co., Ltd.);
    Methylene bis stearic acid amide lubricants, such as DIAMID-200-BIS (trade name; manufactured by Nippon Chemical Co., Ltd.), ARMO WAX (trade name; manufactured by Lion Akzo Co., Ltd.), and BISAMIDE (trade name; manufactured by Nitto Chemical Industry Co., Ltd.);
    Methylene bis oleic acid amide lubricants, such as LUBRON-O (trade name; manufactured by Nippon Chemical Co., Ltd.);
    Ethylene bis stearic acid amide lubricants, such as ARMO SLIP EBS (trade name; manufactured by Lion Akzo Co., Ltd.); and
    Hexamethylene bis stearic acid amide lubricants, such as AMIDE-65 (trade name; manufactured by Kawaken Fine Chemical Co., Ltd.); Hexamethylene bis oleic acid amide lubricants, such as AMIDE-60 (trade name; manufactured by Kawaken Fine Chemical Co., Ltd.), etc.

(2) Non-ionic surface active agent lubricants:
  ELECTRO STRIPPER TS-2 and ELECTRO STRIPPER TS-3 (trade name; manufactured by Kao Corporation), etc.

(3) Hydroxy carbonate lubricants:
  Liquid paraffin, natural paraffin, micro wax, synthetic paraffin, polyethylene wax (preferably 6000 or less in molecular weight), polypropylene wax (preferably 6000 or less in molecular weight), chlorinated hydrocarbon, fluorocarbon, etc.

(4) Fatty acid lubricants:
  Higher fatty acid (those preferable number of carbon atoms is $C_{12}$ or more, such as caproic acid, stearic acid, oleic acid, erucic acid, palmitic acid), oxy fatty acid, etc.

(5) Ester lubricants:
  Fatty acid lower alcohol ester, fatty acid polyvalent alcohol ester, fatty acid polyglycol ester, fatty acid fatty alcohol ester, etc.

(6) Alcohol lubricants:
Polyvalent alcohol, polyglycol, polyglycerol, etc.

(7) Metallic soaps:
Compounds of higher fatty acids such as lauric acid, stearic acid, succinic acid, stearyl lactate, benzoic acid, hydroxy stearic acid, lactic acid, phthalic acid, ricinoleic acid, naphthenic acid, oleic acid, palmitic acid and erucic acid, and metals such as Li, K, Na, Mg, Ca, Sr, Ba, Zn, Cd, Al, Sn, Pb and Cd. Among of these, magnesium stearate, calcium stearate, zinc stearate and magnesium oleate are preferable.

(8) Montanic acid ester partial saponifier.

(9) Silicone lubricants:
Dimethyl polysiloxane of various grades and denaturation thereof (manufactured by Sinetsu Chemical Co., Ltd., and Toray Silicone Co., Ltd.

It is the most preferable to load 0.05 wt % to 2.20 wt % dimethyl polysiloxane lubricant of organo-polysiloxane group having a viscosity of 1,000 CS to 60,000 CS.

Examples of other additive agents which may be added as required to the resin for forming the spool are antioxidant, photo-stabilizer, ultraviolet absorber, nucleator and antistatic agent. Also filler such as alumina, kaoline, clay, calcium carbonate, mica, talc, titanium oxide and silica, or reinforcer such as glass roving, metallic fiber, glass fiber, glass milled fiber, carbon fiber may be added to reduce the shrinkage of the spool.

What is claimed is:

1. A photographic roll film of ISO 120-size or ISO 220-size, having a photographic filmstrip, a light-shielding paper secured to said photographic filmstrip at least at a leading end thereof with an adhesive tape, and a spool having said photographic filmstrip with said light-shielding paper wound in a roll thereon, wherein said photographic roll film is provided with data of said photographic roll film on said adhesive tape which secures said leading end of said photographic filmstrip to said light-shielding paper.

2. A photographic roll film according to claim 1, wherein said data includes film speed data, film size data and film type data.

3. A photographic roll film according to claim 2, wherein said film type data includes data to discriminate between color and black-white films.

4. A photographic roll film according to claim 2, wherein said film type data includes data to discriminate between negative and reversal films.

5. A photographic roll film according to claim 1, wherein said data further includes start detection data.

6. A photographic roll film according to claim 1, wherein said data is provided as optically readable marks.

7. A photographic roll film according to claim 6, wherein said data is provided as bar code.

8. A photographic roll film according to claim 7, wherein a bar of said bar code is perpendicular to a longitudinal direction of said photographic filmstrip.

9. A photographic roll film of ISO 120-size or ISO 220-size, comprising
a photographic filmstrip:
a light-shielding paper secured to said photographic film strip at least at a leading end thereof with an adhesive tape, at least a hole formed through a leader of said light-shielding paper;
a spool having said photographic filmstrip with said light-shielding paper wound in a roll thereon, a slit formed through a spool core of said spool along an axial direction of said spool core;
at least a claw formed on a first wall of said slit, said claw being engaged with said hole when said leader is inserted in said slit, wherein said claw has side projections in proximity to the peak, said projections extending in said axial direction of said spool core; and
at least a rib formed on a second wall of said slit which is opposite and parallel to said first wall, said rib pressing said leader of said light-shielding paper toward said first wall;
wherein said photographic roll film is provided with data of said photographic roll film on at least one of said light-shielding paper, said adhesive tape and said spool.

10. A photographic roll film of ISO 120-size or ISO 220-size, having a photographic filmstrip, a light-shielding paper secured to said photographic filmstrip at least at a leading end thereof with an adhesive tape, and a spool having said photographic filmstrip with said light-shielding paper wound in a roll thereon, wherein said photographic roll film is provided with data of said photographic roll film on said adhesive tape which secures said leading end of said photographic filmstrip to said light-shielding paper; and
wherein said data is provided as optically readable marks.

11. A photographic roll film according to claim 10, wherein said data includes film speed data, film size data and film type data.

12. A photographic roll film according to claim 10, wherein said data further includes start detection data.

13. A photographic roll film according to claim 10, wherein said data is provided as bar code.

14. A photographic roll film according to claim 13, wherein a bar of said bar code is perpendicular to a longitudinal direction of said photographic film.

* * * * *